US008738896B2

(12) United States Patent
Kashima

(10) Patent No.: US 8,738,896 B2
(45) Date of Patent: May 27, 2014

(54) VIRTUAL MACHINE EXECUTION PROGRAM AND INFORMATION PROCESSING DEVICE

(75) Inventor: Hiroaki Kashima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 154 days.

(21) Appl. No.: 12/825,928

(22) Filed: Jun. 29, 2010

(65) Prior Publication Data

US 2010/0269167 A1 Oct. 21, 2010

Related U.S. Application Data

(63) Continuation of application No. PCT/JP2008/000009, filed on Jan. 9, 2008.

(51) Int. Cl.
*H04L 29/06* (2006.01)
*G06F 21/00* (2013.01)

(52) U.S. Cl.
USPC ............................................ 713/154; 726/13

(58) Field of Classification Search
None
See application file for complete search history.

(56) References Cited

U.S. PATENT DOCUMENTS

| 2005/0108709 | A1* | 5/2005 | Sciandra et al. .................. 718/1 |
| 2006/0085857 | A1 | 4/2006 | Omote et al. |
| 2008/0151893 | A1* | 6/2008 | Nordmark et al. ............ 370/392 |
| 2008/0195760 | A1* | 8/2008 | Nudler .......................... 709/248 |
| 2008/0215796 | A1* | 9/2008 | Lam et al. ..................... 711/100 |

FOREIGN PATENT DOCUMENTS

| JP | 2003-44441 | 2/2003 |
| JP | 2004-46460 | 2/2004 |
| JP | 2006-119754 | 5/2006 |

OTHER PUBLICATIONS

TTS, "To master settings of personal firewall", PC Japan, vol. 12, Issue 5, May 2007, pp. 86-93.
Tal Garfinkel. et al., "Terra: A Virtual Machine-Based Platform for Trusted Computing", ACM SIGOPS, Operating Systems Review, vol. 37, Issue 5, ACM, Dec. 2003, pp. 193-206.
TTS, To master settings of personal firewall, PC Japan, vol. 12, Issue 5, May 1, 2007, pp. 86-93.
Release of Security Software that Enables Single PC to be concurrently used for both Confidential use and General use—Realizing Consolidation of Client PCs and Leak Prevention of Confidential Information—; Hitachi Software Engineering; pp. 1-3; Dec. 25, 2007; printed from www.hitachi-solutions.co.jp/company/press/news/soft/archive2007/news487.html.

* cited by examiner

*Primary Examiner* — Izunna Okeke
(74) *Attorney, Agent, or Firm* — Staas & Halsey LLP

(57) ABSTRACT

A program for causing an information processing device to execute a process is recorded on a computer-readable storage medium. The process includes: obtaining an identification of a logged-in account; referencing information that associates an identification of an account with a virtual machine to be permitted to make a communication; recognizing a first virtual machine corresponding to the obtained identification by using the referenced information; executing one or a plurality of virtual machines on the information processing device that is a physical machine; determining whether or not a second virtual machine from which data is transmitted toward a network is the first virtual machine; allowing the data to pass through and transmitting the data toward the network if the second virtual machine is determined to be the first virtual machine; and discarding the data if the second virtual machine is determined not to be the first virtual machine.

15 Claims, 22 Drawing Sheets

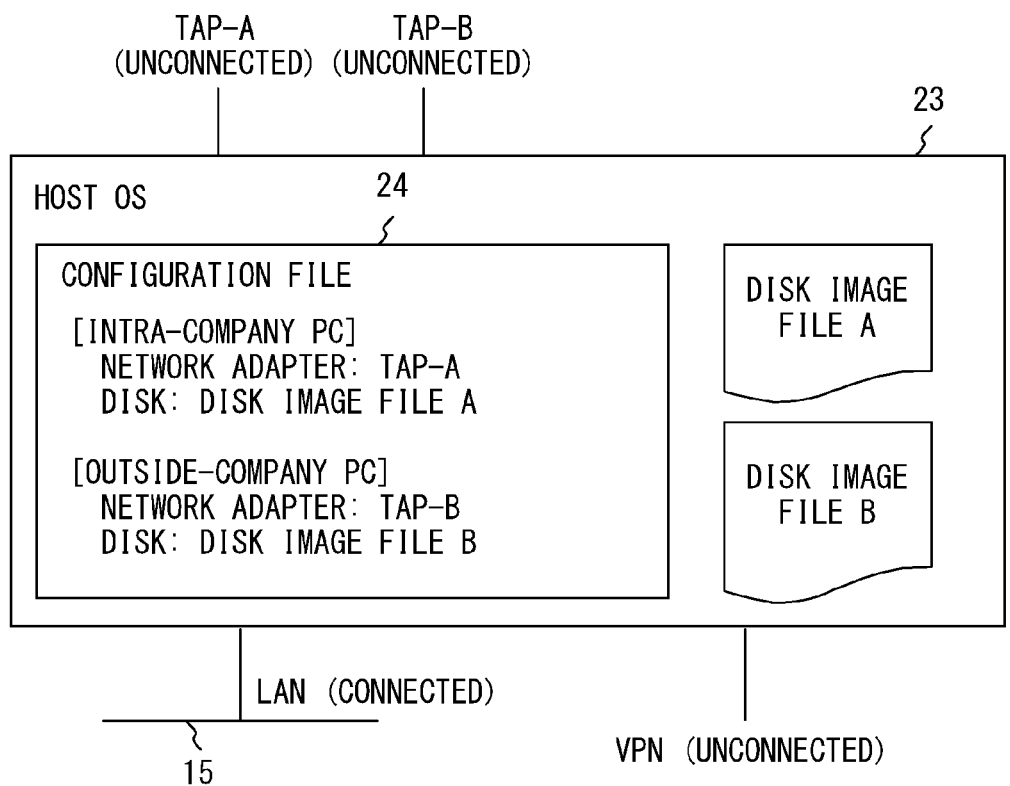
F I G. 2

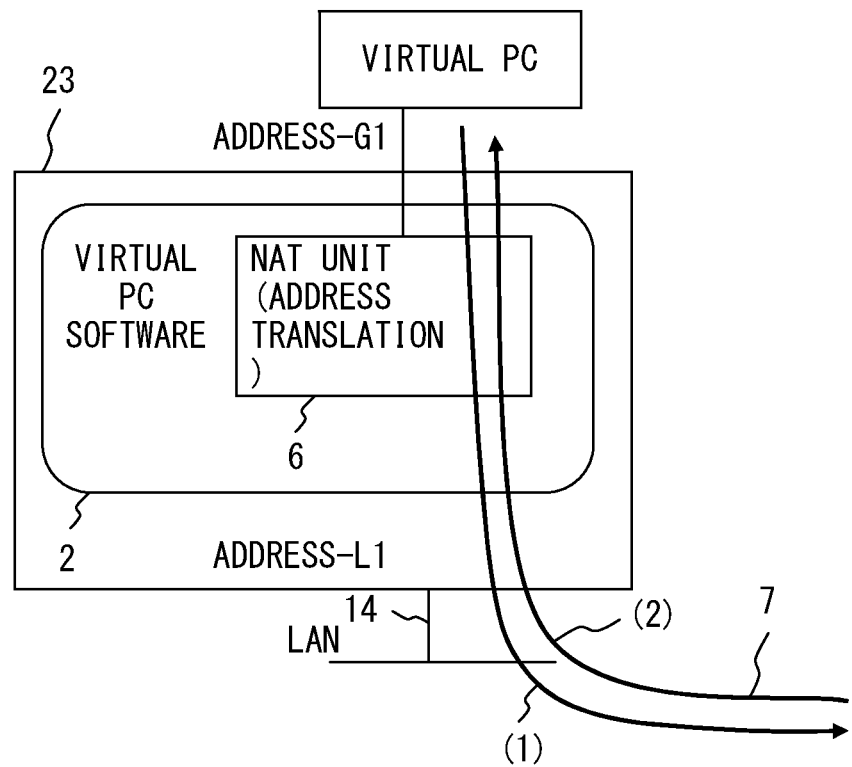
F I G. 4

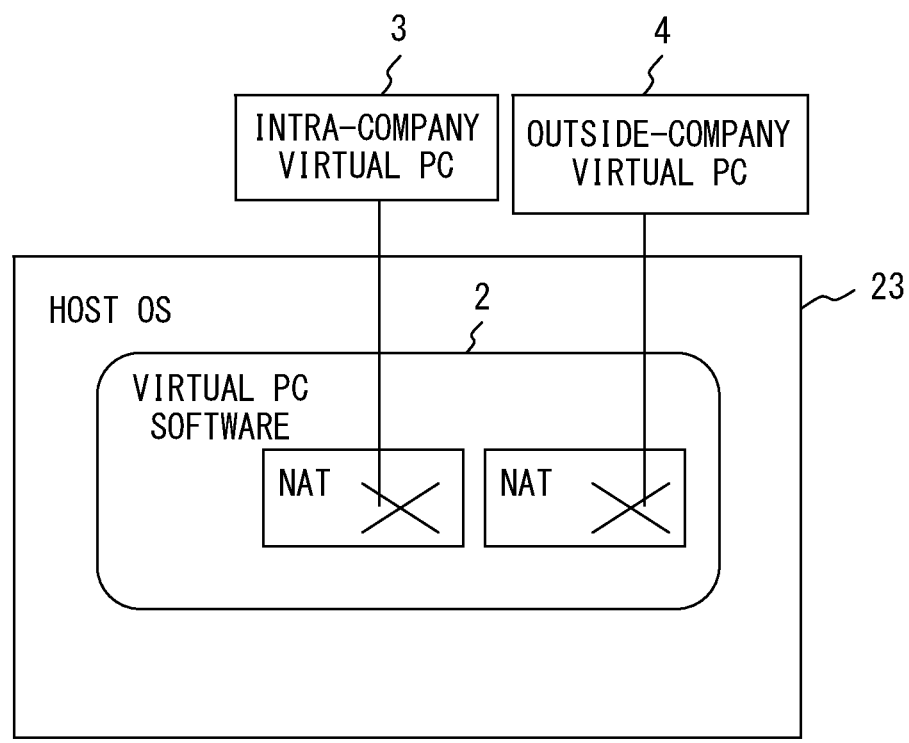
F I G. 5

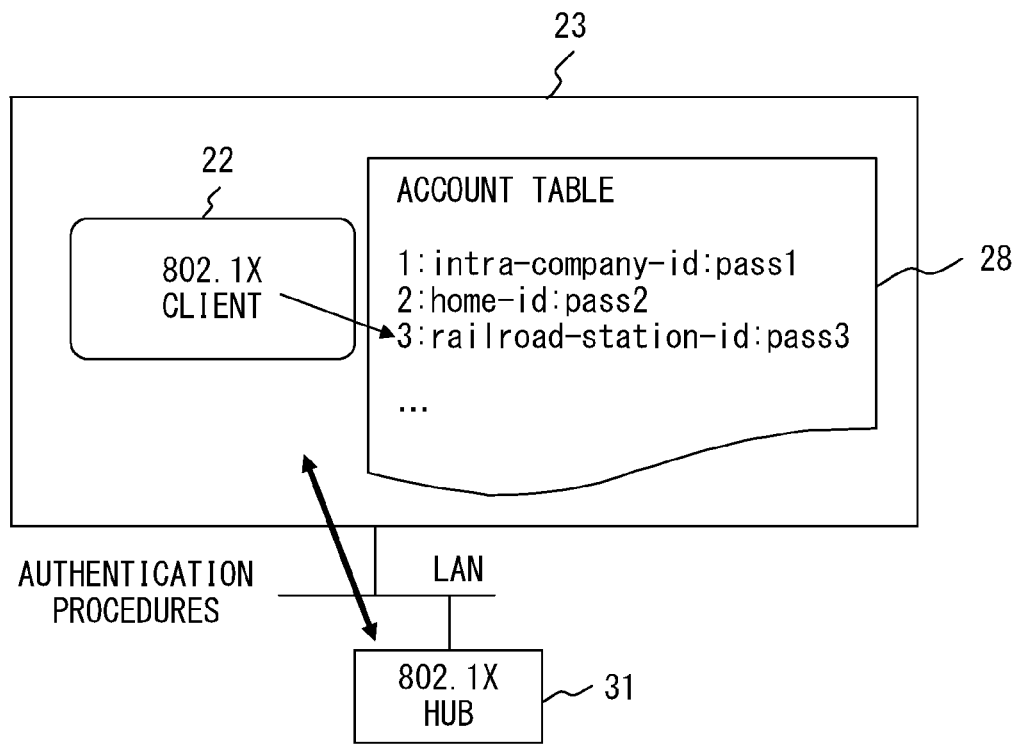
F I G. 7

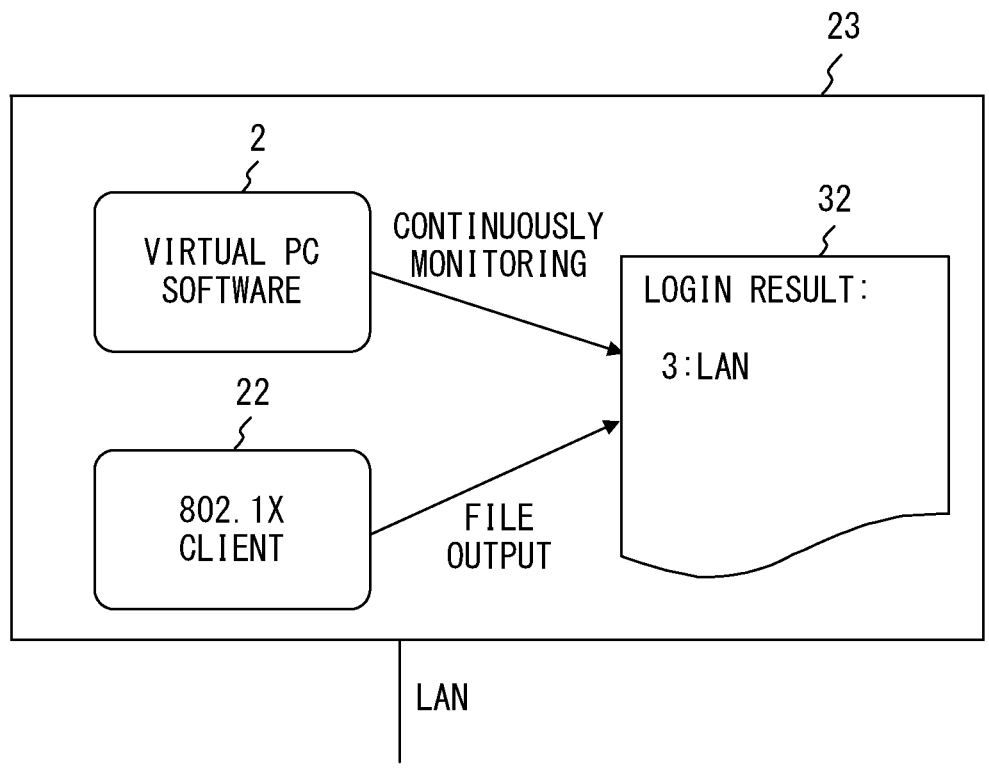
F I G. 8

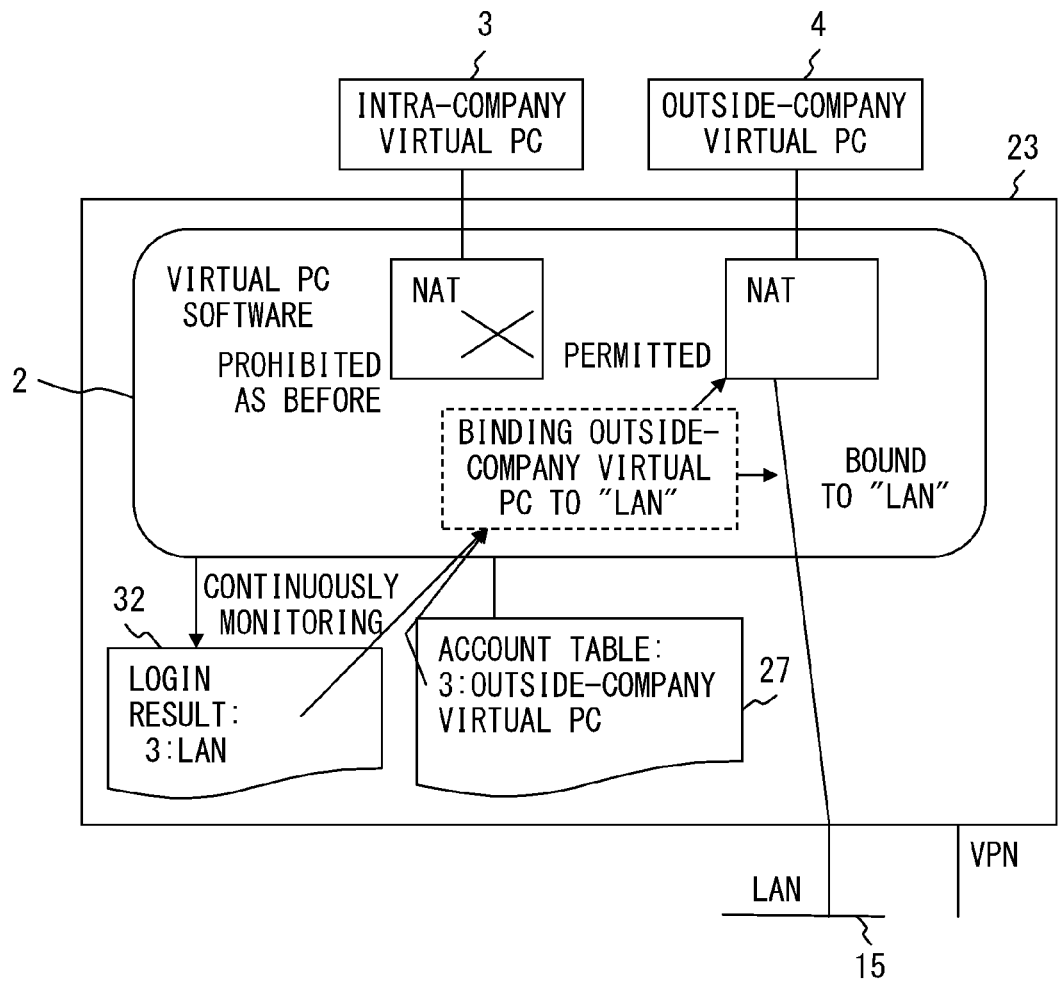
F I G. 9

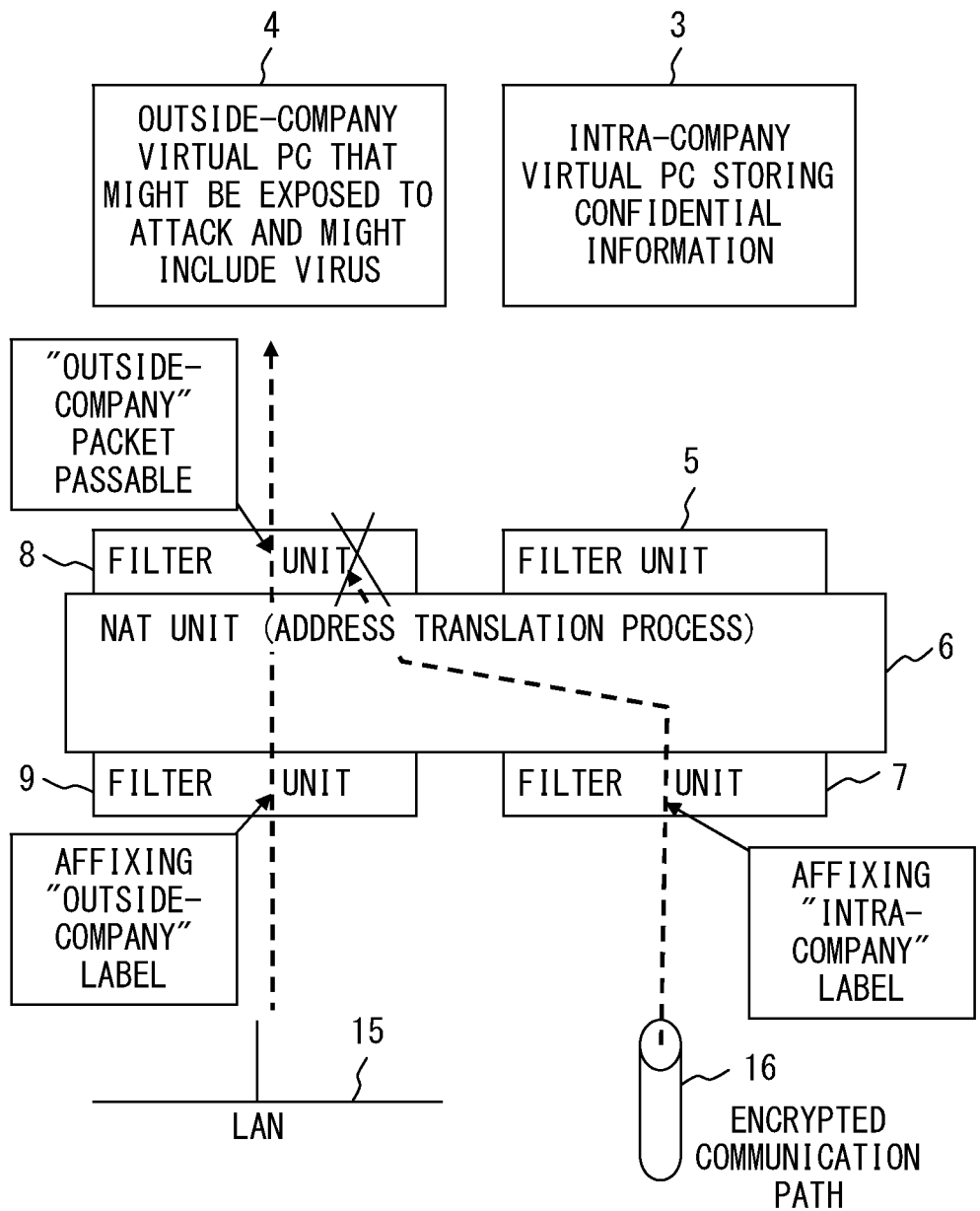
F I G. 11

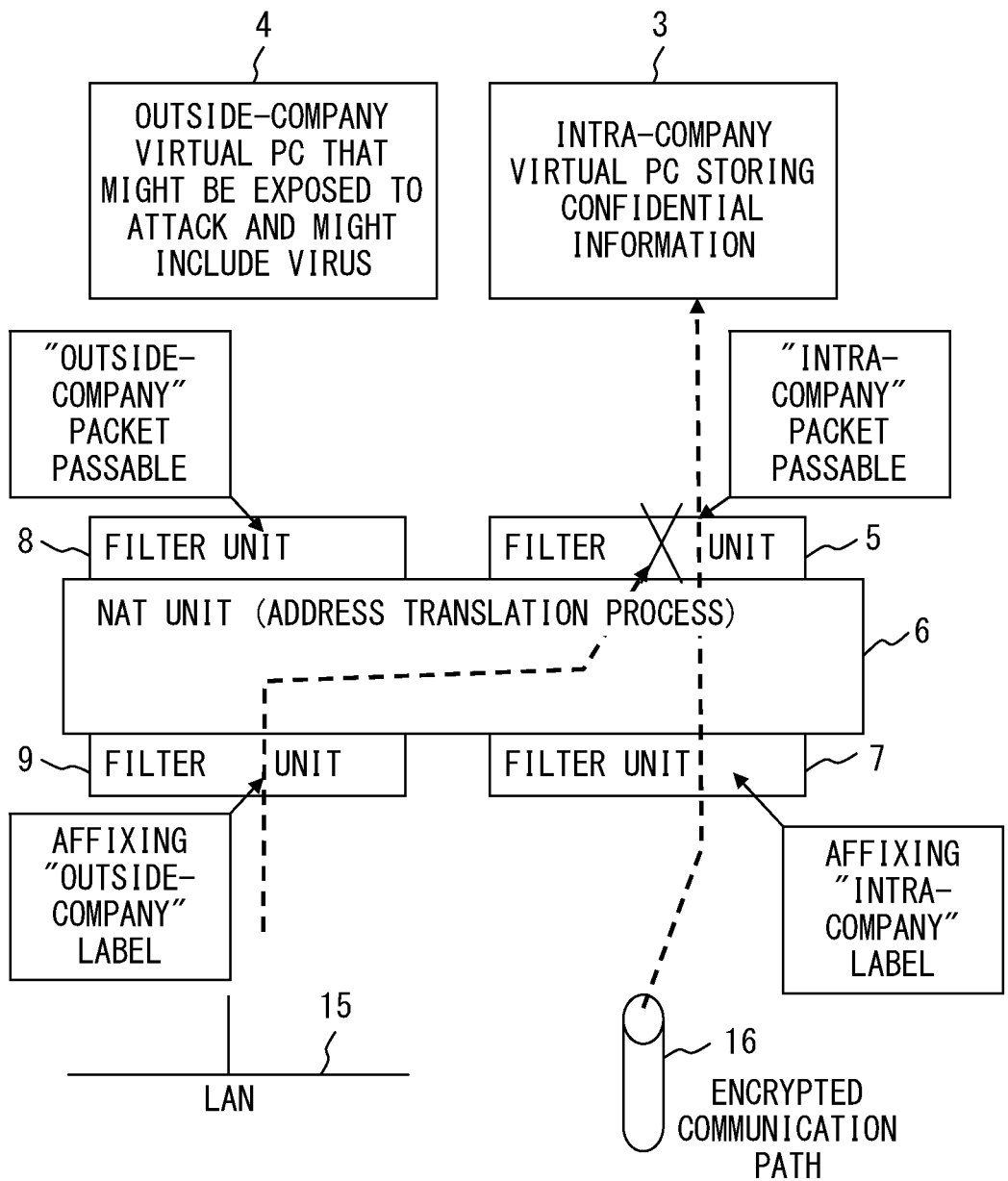
F I G. 1 3

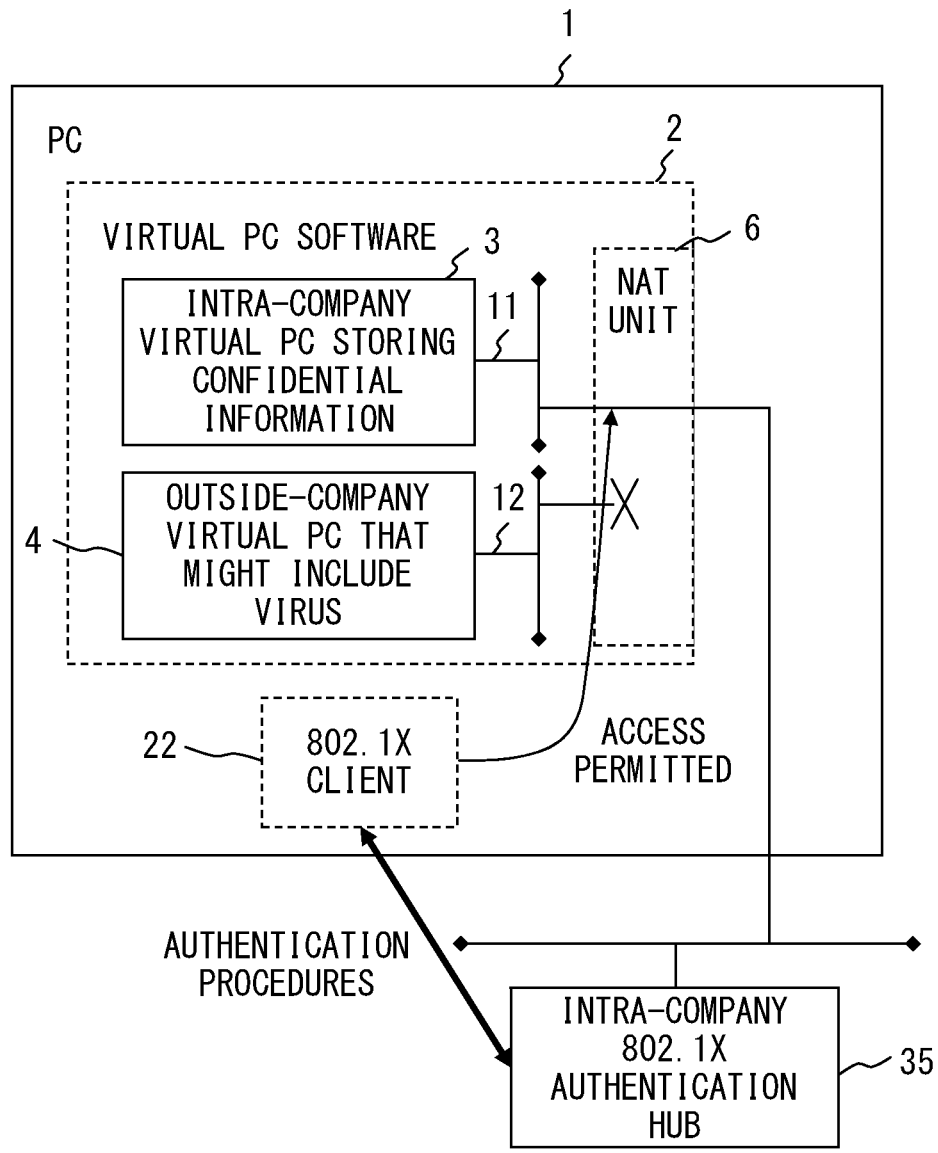
F I G. 1 4

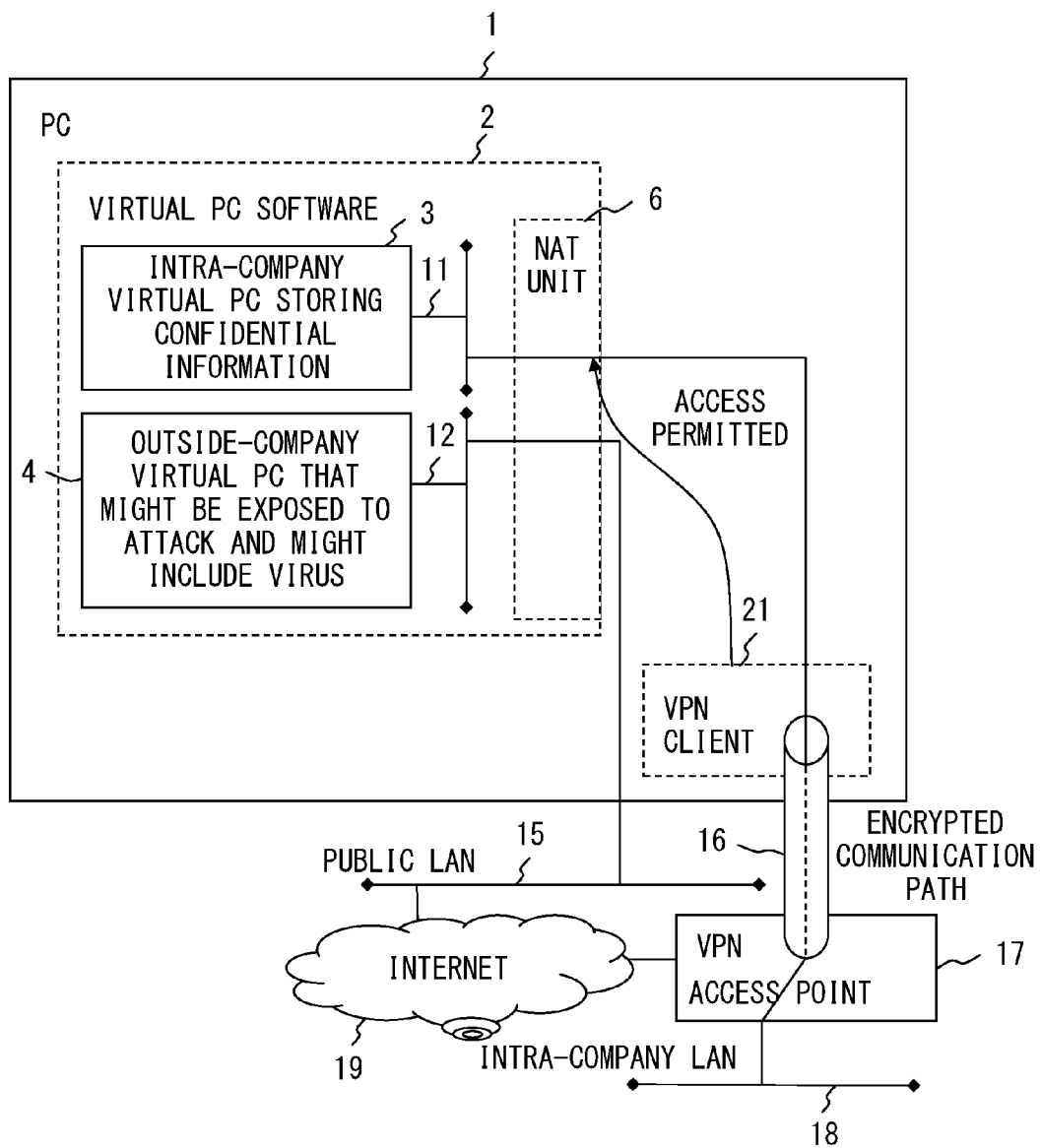
F I G. 1 7

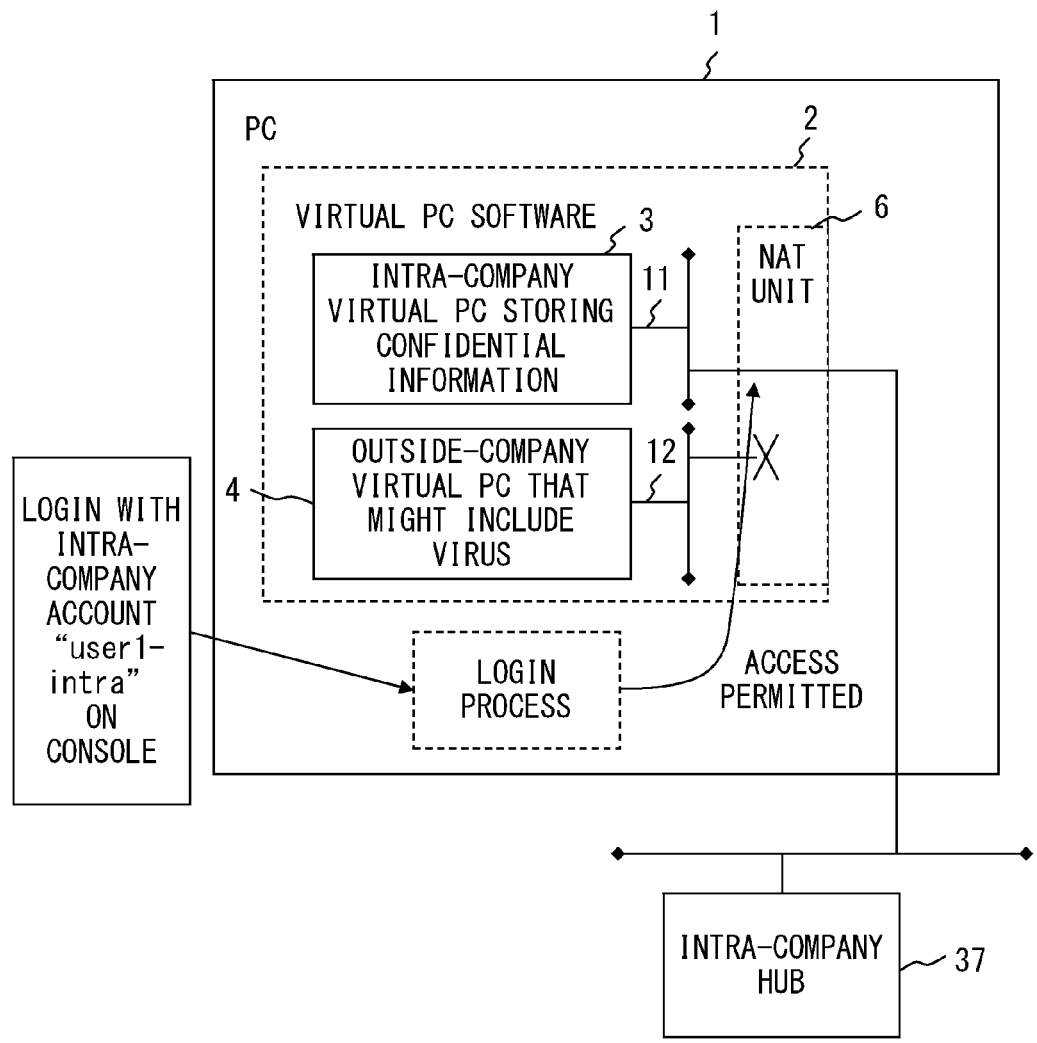
F I G. 1 8

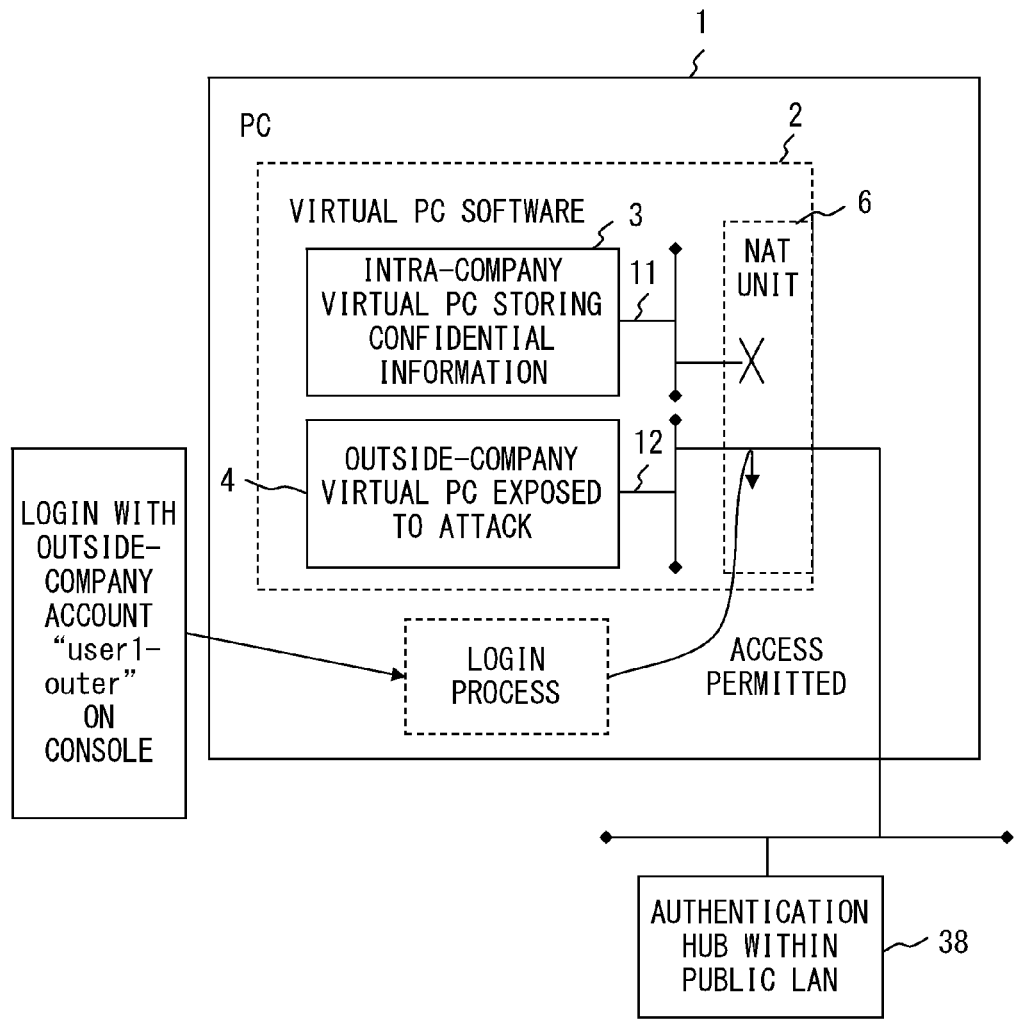
F I G. 1 9

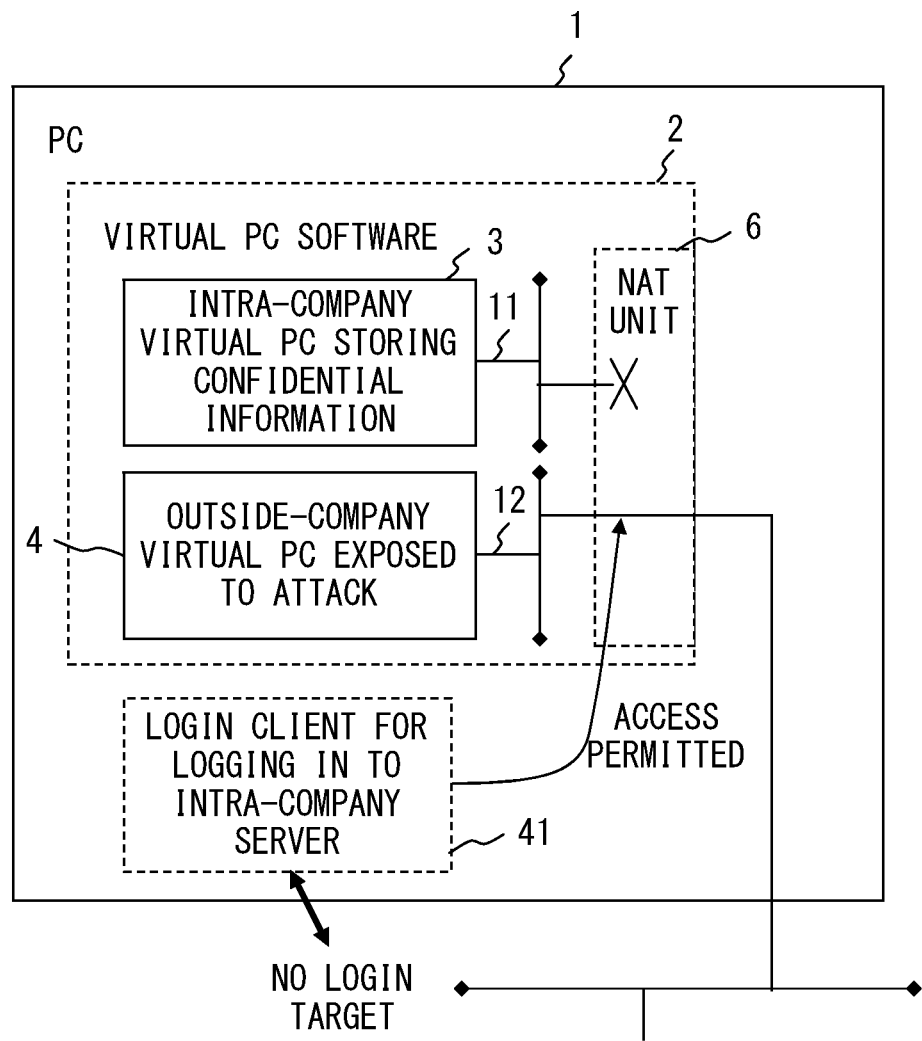
F I G. 2 1

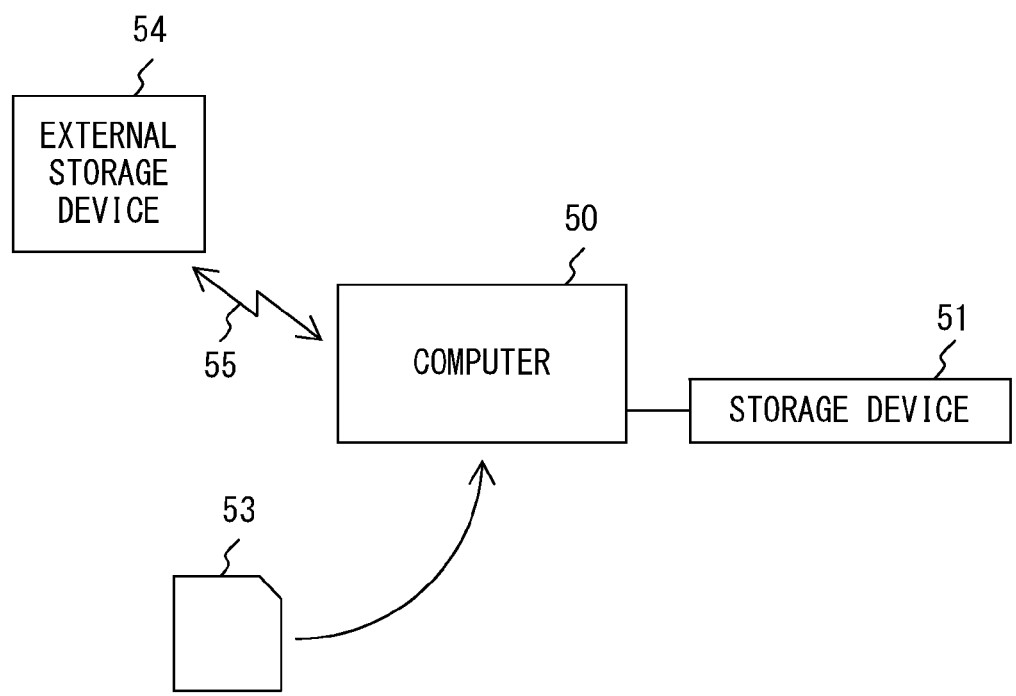
F I G. 2 2

VIRTUAL MACHINE EXECUTION PROGRAM AND INFORMATION PROCESSING DEVICE

CROSS-REFERENCE TO RELATED APPLICATION

This application is a continuation of PCT application PCT/JP2008/000009, which was filed on Jan. 9, 2008, and the entire contents of which are incorporated herein by reference.

FIELD

The embodiments discussed herein are related to a virtual machine execution program and an information processing device having functions of the program.

BACKGROUND

A method for preventing information portability by using a thin client or the like, and encryption of portable information implemented as USB (Universal Serial Bus) memory encryption or the like are known as techniques for preventing confidential information from being leaked.

The technique for preventing information portability disables on-the-spot reference to confidential information if the information becomes necessary outside the company. Accordingly, for example, even when a user stays in the office of a counterpart of a non-disclosure agreement, the user is unable to reference the confidential information, leading to an obstacle to business.

With the method for encrypting portable information, it is impossible to prevent decrypted data from leaking once encrypted information is decrypted as needed.

Additionally, techniques for preventing introduction of viruses include virus infection prevention using virus check software on a personal computer, and virus attack protection using a firewall in a network.

However, virus check software is unable to detect unknown viruses.

In the meantime, a firewall is able to detect some unknown viruses depending on a communication pattern. However, it is costly to provide a firewall, and providing a firewall exerts a lot of influence on communication performance. Therefore, it is difficult to install a firewall in each hub to which, for example, a personal computer brought back to a company from outside is connected.

Furthermore, diverse techniques are known as technology for controlling an access to a network. Some of such techniques are disclosed, for example, in Japanese Laid-open Patent Publication No. 2003-44441 and No. 2004-46460.

For example, according to a certain technique, an access to a communication network is controlled depending on a user by using storing means for storing access control information of each user.

Additionally, according to another certain technique, installation information of Web servers is used as part of information about user access rights to a file management server, and the access rights are controlled to vary depending on whether a user logs in to the file management server with a client via an in-house Web server or the user logs in to the file management server with the client via an external Web server.

However, these techniques control an access made from an outside, and do not control an access made from a local device to an outside.

SUMMARY

According to an aspect of the embodiments, a non-transitory computer-readable storage medium is provided and a program for causing an information processing device to execute a process is recorded on the storage medium.

The process includes obtaining an identification of a logged-in account. The process also includes referencing information that is stored in a storing unit and that makes an association between an identification of an account and a virtual machine to be permitted to make a communication. The process still also includes recognizing a first virtual machine corresponding to the obtained identification of the account by using the referenced information.

The process further includes executing one or a plurality of virtual machines on the information processing device that is a physical machine.

The process further includes determining whether or not a second virtual machine from which data is transmitted toward a first network is the first virtual machine.

The process still further includes allowing the data to pass through and transmitting the data toward the first network if the second virtual machine is determined to be the first virtual machine. The process also includes discarding the data if the second virtual machine is determined not to be the first virtual machine.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 illustrates files managed by the virtual PC software illustrated in FIG. 1;

FIG. 4 illustrates flows of packets incoming into and outgoing from the PC;

FIG. 5 illustrates an initial state of the PC;

FIG. 7 illustrates authentication procedures executed by the user authentication software;

FIG. 8 illustrates operations performed by the user authentication software and the virtual PC software in a case in which login has succeeded;

FIG. 9 illustrates a state of the PC after the login;

FIG. 11 is a schematic (No. 2) illustrating operations performed by the filter units and the NAT unit when a communication between the outside-company virtual PC and the outside is permitted;

FIG. 13 is a schematic (No. 2) illustrating operations performed by the filter units and the NAT unit when a communication between the intra-company virtual PC and the outside is permitted;

FIG. 14 is a schematic (No. 1) of a first example of operations performed by the PC illustrated in FIG. 1;

FIG. 17 is a schematic (No. 4) of the first example of operations performed by the PC illustrated in FIG. 1;

FIG. 18 is a schematic (No. 1) of a second example of operations performed by the PC illustrated in FIG. 1;

FIG. 19 is a schematic (No. 2) of the second example of operations performed by the PC illustrated in FIG. 1;

FIG. 21 is a schematic (No. 2) of the third example of operations performed by the PC illustrated in FIG. 1; and FIG. 22 illustrates examples of storage media.

DESCRIPTION OF EMBODIMENTS

Embodiments are described in detail below with reference to the drawings.

Technology for mapping physical resources of a computer (i.e., information processing device) onto logical resources includes a virtualization technique. For example, this technique enables a plurality of virtual personal computers (hereinafter the term "personal computer" is abbreviated as "PC") to be operated and executed on one physical PC. An OS (Operating System) running on a physical PC is referred to as a host OS, whereas an OS running on a virtual PC is referred to as a guest OS.

Figure 1:
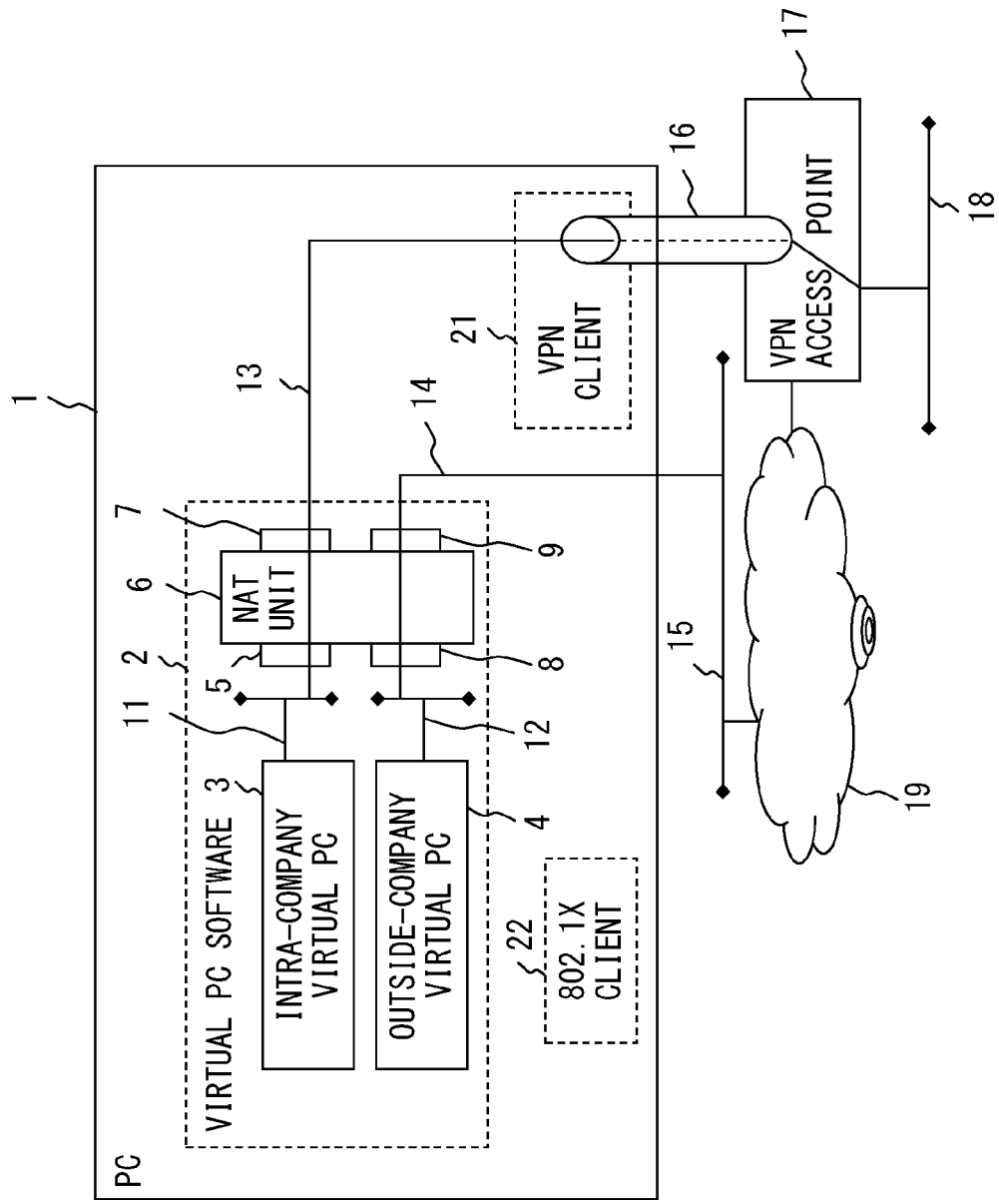
FIG. 1 illustrates a PC where virtual PC software according to one embodiment is installed.

FIG. 1 illustrates a PC where a virtual PC execution program (hereinafter referred to as virtual PC software) according to an embodiment is installed.

In FIG. 1, the virtual PC software 2 is executed on the host OS of the PC 1.

The virtual PC software 2 is software for executing a plurality of virtual PCs (e.g., two virtual PCs in FIG. 1) on the physical PC 1.

In the example illustrated in FIG. 1, an intra-company virtual PC 3 and an outside-company virtual PC 4 operate on the same single physical PC 1. The intra-company virtual PC 3 is an example of a virtual machine for in-house use related to an intranet of a certain organization. The outside-company virtual PC 4 is an example of a virtual machine for external use related to the outside of the intranet.

Moreover, in the example illustrated in FIG. 1, data which is stored in the PC 1 and which includes confidential information is accessible via the intra-company virtual PC 3. Furthermore, data which is stored in the PC 1 and which is less confidential than the data handled by the intra-company virtual PC 3 is accessible via the outside-company virtual PC 4.

A network adapter 11 is a network adapter that connects the intra-company virtual PC 3 and the host OS of the PC 1, whereas a network adapter 12 is a network adapter that connects the outside-company virtual PC 4 and the host OS of the PC 1. In this embodiment, the network adapters are implemented in software.

In the example illustrated in FIG. 1, assume that the PC 1 is carried outside the company and used by a user in the vicinity of a public wireless LAN (Local Area Network) 15 installed at a predetermined site, for example, installed within a railroad station.

A network adapter 14 is a network adapter that connects the PC 1 and the public LAN 15.

A network adapter 13 is a network adapter that connects the PC 1 and a VPN (Virtual Private Network) access point 17. An encrypted communication path 16 is established between a VPN client 21 and the VPN access point 17. An 802.1X client 22 is a user authentication program for executing a user authentication process conforming to an 802.1X protocol. When a user staying outside the company logs in to the PC 1 with the 802.1X client 22, a packet (or data of another form) transmitted from the outside-company virtual PC 4 is permitted to be communicated with the outside. Namely, the packet (or data of another form) transmitted from the outside-company virtual PC 4 is transmitted to the network via a filter unit 8, a NAT (Network Address Translation or Network Address Transform) unit 6, a filter unit 9, the public LAN 15, and the Internet 19. In contrast, a packet transmitted from the network and addressed to the outside-company virtual PC 4 is received by the outside-company virtual PC 4 via the public LAN 15, the filter unit 9, the NAT unit 6, and the filter unit 8.

A filter unit 5 is a filter provided on the side of the intra-company virtual PC 3. A packet transmitted from the intra-company virtual PC 3 toward a network over which a communication is permitted is allowed by the filter unit 5 to pass therethrough. A packet transmitted from the intra-company virtual PC 3 toward a network over which a communication is not permitted is discarded by the filter unit 5.

A filter unit 7 is a filter provided on the side of the physical PC (i.e., PC 1). A packet having passed through a network over which a communication is permitted and being transmitted toward the intra-company virtual PC 3 is allowed by the filter unit 7 to pass therethrough. A packet having passed through a network over which a communication is not permitted and being transmitted toward the intra-company virtual PC 3 is discarded by the filter unit 7.

The filter unit 8 is a filter provided on the side of the outside-company virtual PC 4. A packet transmitted from the outside-company virtual PC 4 toward a network over which a communication is permitted is allowed by the filter unit 8 to pass therethrough. A packet transmitted from the outside-company virtual PC 4 toward a network over which a communication is not permitted is discarded by the filter unit 8.

The filter unit 9 is a filter provided on the side of the physical PC (i.e., PC 1). A packet having passed through a network over which a communication is permitted and being transmitted toward the outside-company virtual PC 4 is allowed by the filter unit 9 to pass therethrough. A packet having passed through a network over which a communication is not permitted and being transmitted toward the outside-company virtual PC 4 is discarded by the filter unit 9.

The NAT unit 6 translates (i.e., transforms) a source address of a packet which is made to pass through by the filter unit 5 or 8 and is transmitted toward the network. Specifically, the NAT unit 6 translates the source address from an address of a virtual PC into an address of the physical PC (i.e., PC 1).

The NAT unit 6 also translates a destination address of a packet which has passed through a network, is made to pass through by the filter unit 7 or 9, and is transmitted toward a virtual PC at a destination. Specifically, the NAT unit 6 translates the destination address from the address of the physical PC (i.e., PC 1) into an address of the virtual PC.

A VPN client 21 is a user authentication program for executing a user authentication process conforming to a VPN protocol. A user attempts login by using the VPN client 21 when he or she intends to access an intra-company system (which exists within the intra-company LAN 18) from the outside. When the user successfully logs in with the VPN client 21 from the outside of the company, a packet transmitted from the intra-company virtual PC 3 is permitted to be communicated with the outside.

Namely, the packet transmitted from the intra-company virtual PC 3 is transmitted to the network via the filter unit 5, the NAT unit 6, the filter unit 7, and the encrypted communication path 16. In contrast, a packet transmitted from the network and addressed to the intra-company virtual PC 3 is received by the intra-company virtual PC 3 via the VPN access point 17, the encrypted communication path 16, the filter unit 7, the NAT unit 6, and the filter unit 5.

A network access control method for use in the PC 1 illustrated in FIG. 1 is described next with reference to FIGS. 2 to 5.

FIG. 2 illustrates files managed by the virtual PC software 2 illustrated in FIG. 1.

In FIG. 2, the network adapters 11, 12, 13 and 14 illustrated in FIG. 1 are denoted as "TAP-A", "TAP-B", "VPN" and "LAN", respectively.

The notation "connected" succeeding the name of the network adapters represents that a communication using the corresponding network adapter is permitted, whereas the notation "unconnected" represents that a communication using the corresponding network adapter is not permitted.

FIG. 2 is depicted from the viewpoint of the OS. In FIG. 2, a configuration file 24 managed by the virtual PC software 2 (not illustrated in FIG. 2), and disk image files are depicted in the host OS 23. Each of the disk image files is a file that a virtual PC uses as a disk, and it stores data of a guest OS and other data. A disk image file is provided for each virtual PC.

The configuration file 24 specifies various items such as:
(A1) network adapters respectively used by virtual PCs running on the virtual PC software 2 of FIG. 1 (e.g., network adapters respectively used by the intra-company virtual PC 3 and the outside-company virtual PC 4 in this example);
(A2) a file used by each virtual PC as a file storing data such as data of a guest OS to be run on the virtual PC; and
(A3) labels that the filters used by each virtual PC respectively affix to a packet.

In the example illustrated in FIG. 2, for the intra-company virtual PC 3, the network adapter TAP-A and a disk image file A are respectively specified as a network adapter and a file for storing data of a guest OS and other data. For the outside-company virtual PC 4, the network adapter TAP-B and a disk image file B are respectively specified as a network adapter and a file for storing data of a guest OS and other data.

Additionally, the "LAN" indicates an adapter for a network such as Ethernet or the like. The "VPN" indicates an adapter available only when login to the VPN access point 17 has properly succeeded with the VPN client 21 illustrated in FIG. 1.

Figure 3:
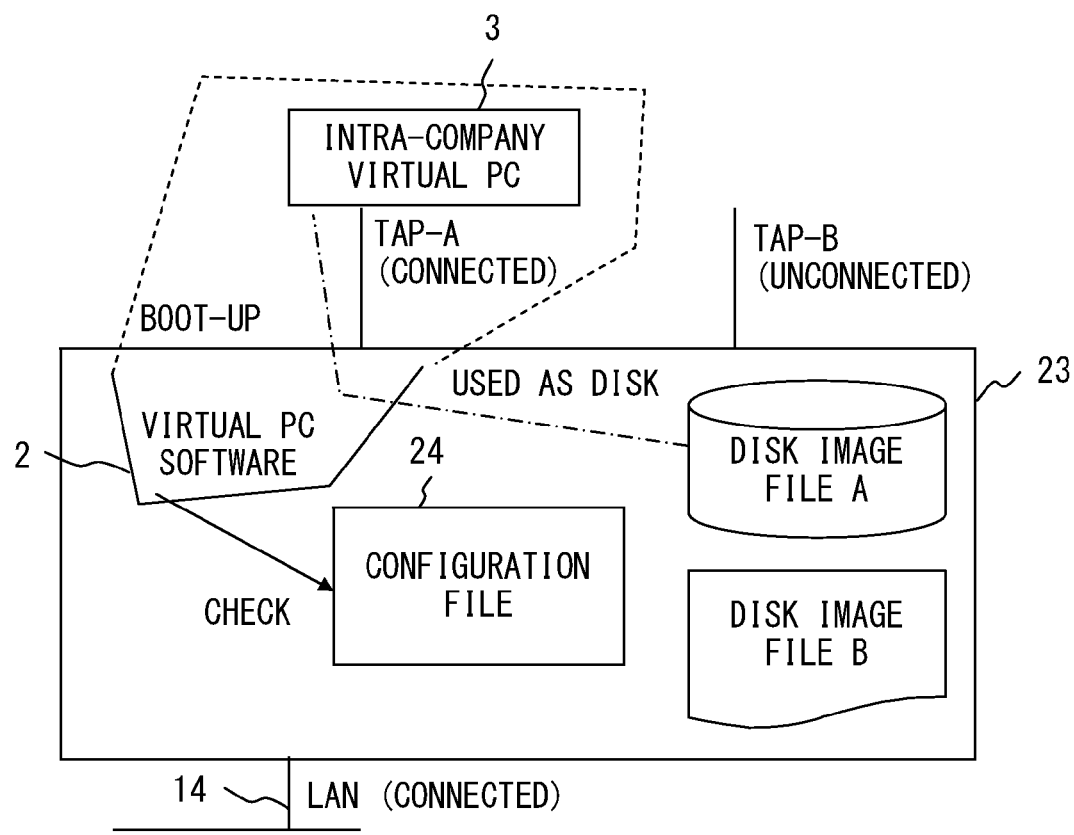
FIG. 3 illustrates a state where an intra-company virtual PC has booted up.

A state of FIG. 2 where none of the virtual PCs has booted up shifts to the state illustrated in FIG. 3 upon boot-up of the intra-company virtual PC 3. Here, it is assumed that the intra-company virtual PC 3 is booted up. Actually, however, all or some of virtual PCs configured in the configuration file 24 of FIG. 2 (e.g., both or either of the intra-company virtual PC 3 and the outside-company virtual PC 4 in this example) may be arbitrarily specified to be booted up.

FIG. 3 is depicted from the viewpoint of the OS. In FIG. 3, the intra-company virtual PC 3 is connected to the network adapter TAP-A. One or a plurality of pieces of virtual PC software 2 boot(s) up in the host OS 23, and a plurality of virtual PCs boot up as units within the virtual PC software 2 that has booted up. This embodiment concerns the case where one piece of virtual PC software boots up.

The virtual PC software 2 behaves towards virtual PCs as if it were a PC that is hardware, and also as if it were a network adapter. Accordingly, the host OS 23 is able to recognize as if a virtual PC appears via the network adapter TAP-A or TAP-B.

Therefore, upon boot-up of the intra-company virtual PC 3, the network adapter TAP-A that connects the host OS 23 and the intra-company virtual PC 3 changes from the "unconnected" state to the "connected" state. Moreover, the disk image file A is used as a disk by the intra-company virtual PC 3.

If the outside-company virtual PC 4 boots up, the network adapter TAP-B that connects the host OS 23 and the outside-company virtual PC 4 changes from the "unconnected" state to the "connected" state although this scenario is not illustrated in FIG. 3. Moreover, the disk image file B is used as a disk by the outside-company virtual PC 4.

A method by which a virtual PC communicates with an outside is described next with reference to FIG. 4.

A packet exchange between the virtual PC and the outside is performed via the NAT unit 6. Namely, if a packet is transmitted from the virtual PC toward the outside (see case (1) of FIG. 4), a source address (i.e., transmission source address) that indicates a transmission source is translated by the NAT unit 6 from G1 that is an address of the virtual PC into L1 that is an address of the PC 1, and the address-translated packet is transmitted to the outside.

Inversely, if a packet is transmitted from the outside toward the virtual PC (see case (2) of FIG. 4), a destination address (i.e., transmission destination address) of a packet returned to L1 (i.e., returned to the address of the PC1) is translated by the NAT unit 6 from the address L1 of the PC 1 into the address G1 of the virtual PC, and the address-translated packet is transmitted to the virtual PC.

This method enables a communication made by a guest OS running on a virtual PC to appear as if it were a communication made by the host OS 23.

In the initial state, neither the intra-company virtual PC 3 nor the outside-company virtual PC 4 is able to communicate with an outside as illustrated in FIG. 5.

Described next with reference to FIGS. 6 to 13 includes the following processes (B1) and (B2):
(B1) a process for outputting or notifying processing results of connection to a public LAN and user authentication which are executed by the user authentication software such as the 802.1X client 22 or the like; and
(B2) a process that is executed on the side of the virtual PC software 2 according to the login result when a packet is transmitted toward or from a virtual PC.

In this embodiment, assume that a user remembers respective accounts and passwords to be used when he or she stays within a company, at home, in a railroad station, etc. Also assume that the user is authenticated by manually inputting a suitable account at each of the sites with the user authentication software such as the 802.1X client 22 or the like. In addition, assume that the user uses an outside-company account when he or she is outside the company, and uses an intra-company account when he or she is within the company.

When automatic login is performed by the user authentication software such as the 802.1X client 22 or the like, the process is executed as follows.

Namely, when the virtual PC software 2 boots up, it displays a use mode selection screen for prompting a user to select whether he or she uses the PC within the company or outside the company. This prompts a user to select a use mode, i.e., to select whether he or she uses the PC either within the company or outside the company. A result of the selection is written to a predetermined file. This predetermined file is a file known to each piece of user authentication software.

Figure 6:
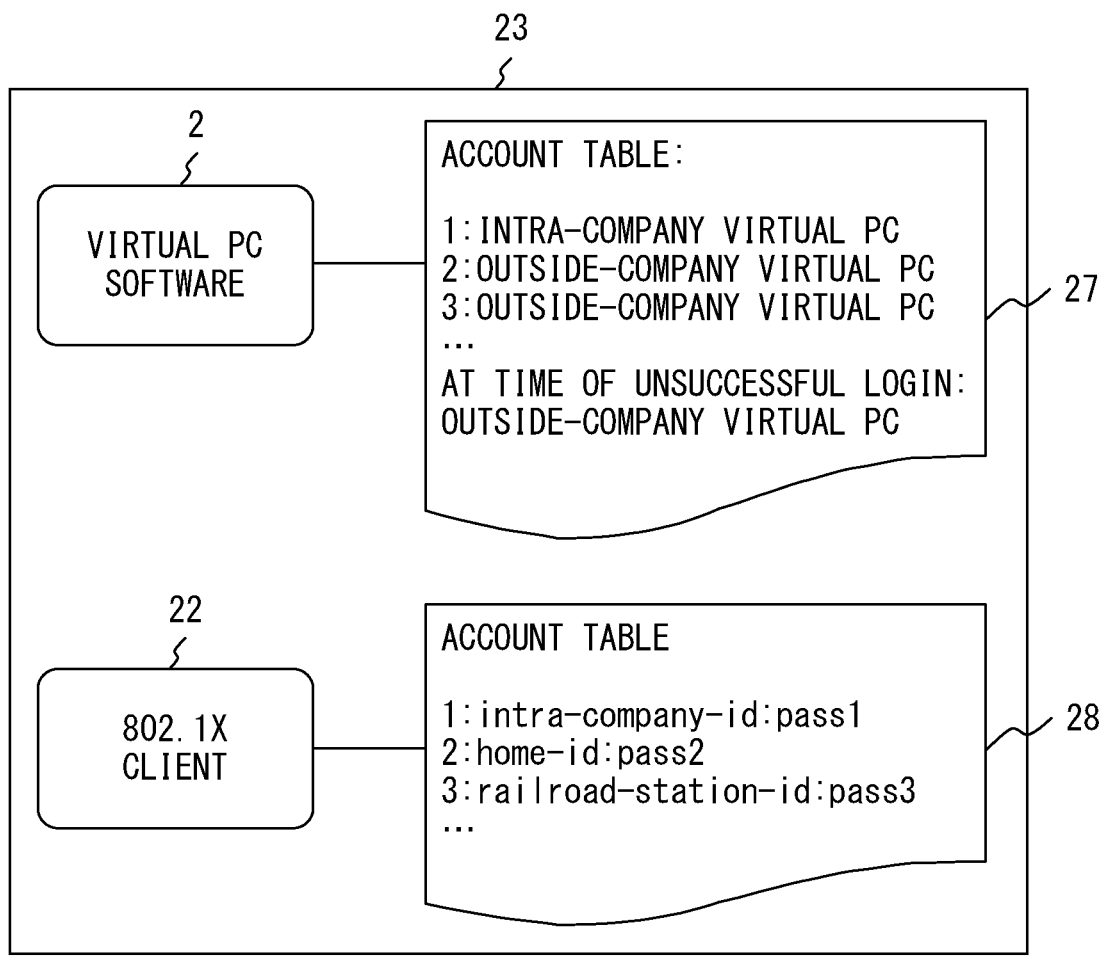
FIG. 6 illustrates an account table held by the virtual PC software, and an account table held by user authentication software.

Additionally, the user authentication software such as the 802.1X client 22 owns an account table 28 illustrated in FIG. 6. In the account table 28, a pair of each of a plurality of accounts such as "intra-company-id", "home-id", "railroad-station-id" or the like and a password for each of the accounts is associated with an identification number for identifying a pair of an account and a password.

Moreover, an item (hereinafter referred to as "use site" item) for defining whether each account is used within the company or used outside the company may be added to the account table 28. If it is assumed that a user manually operates the user authentication software and no other scenario is assumed, there is no need to add the "use site" item.

The 802.1X client 22 references a value of the use mode written in the predetermined file. The value has been selected by the user and indicates "use within a company" or "use outside the company". As illustrated in FIG. 7, the 802.1X client 22 sequentially attempts login to account (s) written in row (s) having the same value as the user-selected value in the account table 28. With this method, the user logs in to the intra-company account when he or she is within the company, or logs in to the outside-company account when he or she is outside the company.

Namely, except for a case where the user erroneously selects a use mode, and a case where the user intentionally selects a false mode, the following scenarios (C1) and (C2) are avoided.
(C1) The user logs in to the outside-company account when he or she is within the company. As a result, a communication with an outside by the outside-company virtual PC 4 is permitted, and thereby an intra-company system might be attacked by a virus that might hide in the outside-company virtual PC 4.
(C2) The user logs in to the intra-company account when he or she is outside the company. As a result, a communication with an outside by the intra-company virtual PC 3 is permitted, and thereby the intra-company virtual PC 3 storing confidential information might be attacked by a virus.

The authentication procedures with an authentication hub 31 within an automatically connected public LAN may be executed by referencing information used in the 802.1X protocol.

The above description refers to the 802.1X standard as an example. However, standards other than the 802.1X standard may be used. For example, the 802.11g standard may be used, and in this case, an available account may be selected by using an SSID (Service Set ID).

An account table 27 managed by the virtual PC software 2 makes an association between an identification number, recorded in the account table 28, for identifying a pair of an account and a password, and (a name of) a virtual PC to be enabled to communicate with an outside.

When login succeeds, the 802.1X client 22 outputs, to a file 32 to which an authentication result is to be output, an identification number of the logged-in account, and information for identifying a network adapter that the account uses for a communication with the outside, as illustrated in FIG. 8.

The virtual PC software 2 continuously monitors the file 32. When data is written to the file 32, the virtual PC software 2 immediately reads the written data from the file 32, and stores the read data in a cache (not illustrated). Alternatively, the virtual PC software 2 reads data from the file 32 in order for a filter process when a packet is transmitted from the virtual PC toward an outside or from the outside toward the virtual PC.

According to the login result, the virtual PC software 2 changes its state to a state where a communication between the outside-company virtual PC 4 and the outside is permitted and where an available network adapter is limited to the network adapter "LAN" as illustrated in FIG. 9. Subsequent operations of the virtual PC software 2 will be described later with reference to FIGS. 10 and 11.

In the PC 1, a plurality of pieces of user authentication software are installed. Each of the pieces of user authentication software owns the account table 28 illustrated in FIG. 6. Accordingly, there are as many account tables 27, each of which is managed by the virtual PC software 2 as illustrated in FIG. 6, as the number of pieces of user authentication software installed in the PC 1.

Furthermore, a file 32 to which an authentication result is output is provided for each of the pieces of user authentication software. Accordingly, the virtual PC software 2 manages a file that stores information indicating which piece of user authentication software outputs its authentication result to which file (i.e., the virtual PC software 2 manages a file that stores a list of output files).

When the intra-company virtual PC 3 is additionally logged in with the VPN client 21 (not illustrated in FIG. 9) in the state illustrated in FIG. 9, data that indicates "account identification number=1, network adapter=VPN" is written by the VPN client 21 to a file not illustrated.

The virtual PC software 2 immediately reads the data written to the file, and stores the read data in the cache (not illustrated). Alternatively, the virtual PC software 2 reads data from the file in order for a filter process when a packet is transmitted from a virtual PC toward an outside or from the outside toward the virtual PC.

Assume that the intra-company virtual PC is set in a particular account table as a name of a virtual PC corresponding to the identification number ("1" in this case) of an account logged in with the VPN client 21. Note that the identification number is part of data written to the above-mentioned file. Also note that the particular account table is not illustrated and is assumed to be an account table managed by the virtual PC software 2 for the VPN client 21.

In this case, according to the login result, the virtual PC software 2 changes its state to a state where a communication between the intra-company virtual PC 3 and the outside is permitted and where an available network adapter is limited to the network adapter "VPN". Subsequent operations of the virtual PC software 2 will be described later with reference to FIGS. 12 and 13.

Figure 10:
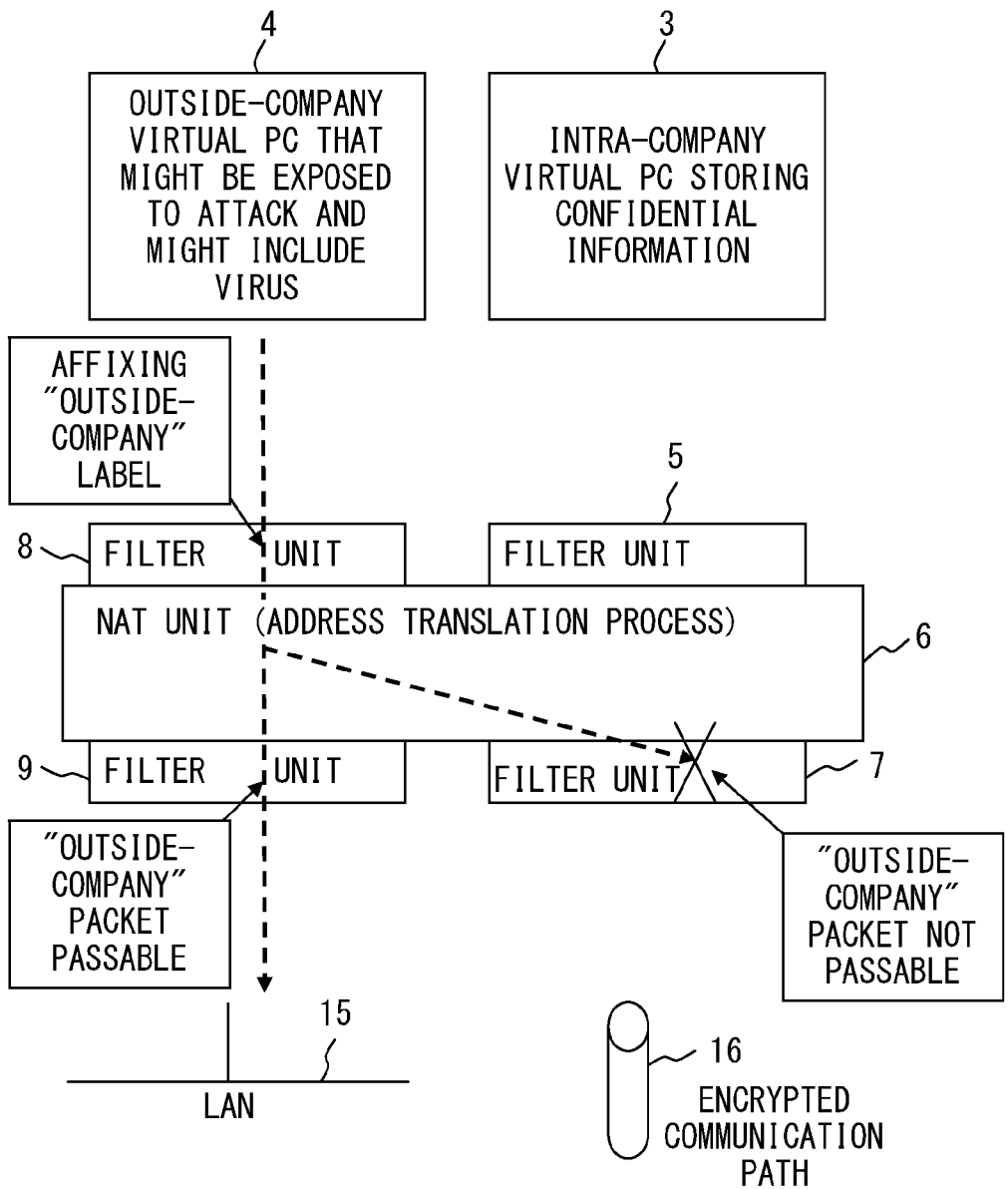
FIG. 10 is a schematic (No. 1) illustrating operations performed by filter units and a NAT unit when a communication between an outside-company virtual PC and an outside is permitted.

FIGS. 10 and 11 illustrate operations of the filter units and the NAT unit 6 when a communication between the outside-company virtual PC and an outside is permitted.

Here, the sentence "the communication between the outside-company virtual PC 4 and the outside is permitted" means the following (D1) or (D2).
(D1) Data corresponding to the permission of the communication between the outside-company virtual PC 4 and the outside has been written to any one of the files (e.g., to the file 32) listed in the list, managed by the virtual PC software 2, of output files for login results.
(D2) The virtual PC software 2 has received a notification of the corresponding data from the user authentication software such as the 802.1X client 22 or the like.

Although not evident from FIG. 2, information about two filters to be used (e.g., the filter units 8 and 9 for the outside-company virtual PC 4), namely, label names that the two filters respectively affix to a packet are described in the configuration file 24 of FIG. 2. Specifically, such information (i.e., label names), as well as information about network adapters to be used, is described in data of each virtual PC which may be booted up.

For example, if login is performed by using the 802.1X client 22 and is performed at a certain site which is outside the company and which is in the vicinity of the access point within the railroad station, data items such as an identification number "3" of the account, which indicates the access point within the railroad station, and the network adapter "LAN" in use are written to the file 32.

In this case, in FIG. 10, upon receipt of a packet transmitted from the outside-company virtual PC 4, the filter unit 8 determines whether or not supplementary data (in other words, auxiliary data) is added to the received packet. If the supplementary data is not added to the packet, the filter unit 8 references the list, managed by the virtual PC software 2, of output files for login results for all pieces of installed user authentication software. Then, the filter unit 8 executes the following process for the files included (i.e., listed) in the list. Alternatively, the filter unit 8 references rows (each of which is data for one file) of the above-described cache, to which content of each of the files within the list has been written, and the filter unit 8 executes the following process.

Namely, the filter unit 8 references the identification number of the account in data, represented as a tuple (an identification number of an account, a network adapter), of the currently-focused file. The filter unit 8 thereby obtains a certain row represented as a tuple (an identification number of an account, a name of a virtual PC permitted to make a communication) within the account table managed by the virtual PC software 2; specifically, the filter unit 8 obtains the row that matches the referenced identification number. Then, the filter unit 8 extracts the name of the virtual PC described in this row. At this time, the filter unit 8 adds a tuple (the extracted name of the virtual PC, the above-described network adapter) to a temporary list used in a process to be executed later.

If the extracted name of the virtual PC matches the name of the virtual PC for which the filter unit 8 is responsible, the filter unit 8 learns that its corresponding virtual PC is permitted to communicate. Then, the filter unit 8 executes a process for identifying a virtual PC that has transmitted the packet, and a process for affixing a label.

In the meantime, if the extracted name of the virtual PC mismatches the name of the virtual PC for which the filter unit 8 is responsible, the filter unit 8 recognizes the next listed file in the list as a file to be processed, and repeats the above described operations for extracting a virtual PC name.

If no more file to be processed is left in the list as a result of such repetition of operations, the filter unit 8 discards the packet received from the outside-company virtual PC 4.

The above described process is specifically executed as follows. Namely, the filter unit 8 references the identification number ("3" in this case) of the account in data of the predetermined file 32. The filter unit 8 thereby obtains a row that matches this identification number, namely, it obtains the row within the account table 27 managed by the virtual PC software 2. Then, the filter unit 8 extracts the name "outside-company virtual PC" as the name of the virtual PC described in this row.

If the extracted name of the virtual PC matches the name of the virtual PC for which the filter unit 8 is responsible, the filter unit 8 references a source address included in the packet. Based on the source address, the filter unit 8 then identifies the virtual PC (outside-company virtual PC 4 in this case) that has transmitted the packet.

If the name of the identified virtual PC at the source mismatches the name of the virtual PC for which the filter unit 8 is responsible, the filter unit 8 discards the received packet.

If the name of the identified virtual PC at the source matches the name of the virtual PC for which the filter unit 8 is responsible, the filter unit 8 references the above-created temporary list and thereby recognizes a network adapter corresponding to the virtual PC for which the filter unit 8 is responsible. Then, the filter unit 8 references the routing table or the like and thereby determines whether or not the received packet is transmitted to a network corresponding to the recognized network adapter.

If determining that the received packet is not transmitted to the corresponding network, the filter unit 8 discards the received packet.

Alternatively, if determining that the received packet is transmitted to the corresponding network, the filter unit 8 adds certain labels to the packet as supplementary data, namely, the filter unit 8 adds an "outside-company" label, and a "source" label indicating that the address to be translated is the source address. Then, the filter unit 8 transmits the packet to the NAT unit 6.

The NAT unit 6 references the supplementary data of the packet and translates the source address included in the packet from the address of the outside-company virtual PC 4 into that of the PC 1. Then, the NAT unit 6 references the routing table or the like and transmits the address-translated packet to the filter units 9 and 7.

The filter unit 9 that has received the address-translated packet determines whether or not the supplementary data is added to the received packet. If the supplementary data is added, the filter unit 9 further determines whether or not content of the supplementary data is "outside-company".

If the content of the supplementary data is not "outside-company", the filter unit 9 discards the received packet.

If the content of the supplementary data is "outside-company", the filter unit 9 discards only the supplementary data from the received packet, and transmits the remaining portion of the received packet to the LAN 15.

In the meantime, the filter unit 7 that has received the address-translated packet discards the received packet because the content of the supplementary data of the received packet is not "intra-company" but "outside-company".

A case where a response is made to the packet transmitted in FIG. 10 is described with reference to FIG. 11.

In FIG. 11, the filter unit 9 that has received a response packet (i.e., reply packet) to the packet transmitted in FIG. 10 determines whether or not supplementary data is added to the received packet.

If the supplementary data is not added to the received packet, the filter unit 9 references the list of output files for login results. As described above, the list is managed by the virtual PC software 2, and all output files for all of pieces of installed user authentication software are listed in the list. Then, the filter unit 9 executes the following process for the files included (i.e., listed) in the list.

Namely, the filter unit 9 references the identification number of the account in data, represented as a tuple (an identification number of an account, a network adapter), of the currently-focused file. The filter unit 9 thereby obtains a certain row represented as a tuple (an identification number of an account, a name of a virtual PC permitted to make a communication) within the account table managed by the virtual PC software 2; specifically, the filter unit 9 obtains the row that matches the referenced identification number. Then, the filter unit 9 extracts the name of the virtual PC described in this row. At this time, the filter unit 9 adds a tuple (the extracted name of the virtual PC, the above-described network adapter) to a temporary list used in a process to be executed later.

If the extracted name of the virtual PC matches the name of the virtual PC for which the filter unit 9 is responsible, the filter unit 9 learns that its corresponding virtual PC is permitted to make a communication. Then, the filter unit 9 executes a process for identifying a virtual PC to receive the packet, and a process for affixing a label.

In the meantime, if the extracted name of the virtual PC mismatches the name of the virtual PC for which the filter unit 9 is responsible, the filter unit 9 recognizes the next listed file in the list as a file to be processed, and repeats the above described operations for extracting a virtual PC name.

If no more file to be processed is left in the list as a result of such repetition of operations, the filter unit 9 discards the received packet.

The above described process is specifically executed as follows. Namely, the filter unit 9 references the identification number ("3" in this case) of the account in data of the predetermined file 32. The filter unit 9 thereby obtains a row that matches this identification number, namely, it obtains the row within the account table 27 managed by the virtual PC software 2. Then, the filter unit 9 extracts the name "outside-company virtual PC" as the name of the virtual PC described in this row.

If the name of the extracted virtual PC matches the name of the virtual PC for which the filter unit 9 is responsible, the filter unit 9 references transmission history information held by the PC 1, and the routing table managed by the NAT unit 6. The filter unit 9 thereby identifies a destination of the received packet.

If the name of the identified virtual PC at the destination mismatches the name of the virtual PC for which the filter unit 9 is responsible, the filter unit 9 discards the received packet.

If the name of the identified virtual PC at the destination matches the name of the virtual PC for which the filter unit 9 is responsible, the filter unit 9 references the above-created temporary list and thereby recognizes a network adapter corresponding to the virtual PC for which the filter unit 9 is responsible. Then, the filter unit 9 references the routing table or the like and thereby determines whether or not the received packet has passed through the network corresponding to the recognized network adapter.

If determining that the received packet has not passed through the corresponding network, the filter unit 9 discards the received packet.

In the meantime, if determining that the received packet has passed through the corresponding network, the filter unit 9 adds certain pieces of data to the packet as supplementary data, namely, the filter unit 9 adds an "outside-company" label, a "destination" label indicating that an address to be translated is the destination address, and the identified destination. Then, the filter unit 9 transmits the packet to the NAT unit 6.

The NAT unit 6 references the supplementary data within the received packet and translates the destination address of the received packet from the address of the PC 1 into the address of the outside-company virtual PC 4. Then, the NAT unit 6 transmits the address-translated packet to the filter units 8 and 5.

The filter unit 8 that has received the address-translated packet determines whether or not supplementary data is added to the received packet. If the supplementary data is added, the filter unit 8 further determines whether or not content of the supplementary data is "outside-company".

If the content of the supplementary data is not "outside-company", the filter unit 8 discards the received packet.

If the content of the supplementary data is "outside-company", the filter unit 8 discards only the supplementary data from the received packet, and transmits the remaining portion of the received packet to the outside-company virtual PC 4.

In the meantime, the filter unit 5 that has received the address-translated packet discards the received packet because the content of the supplementary data of the received packet is not "intra-company" but "outside-company".

Figure 12:
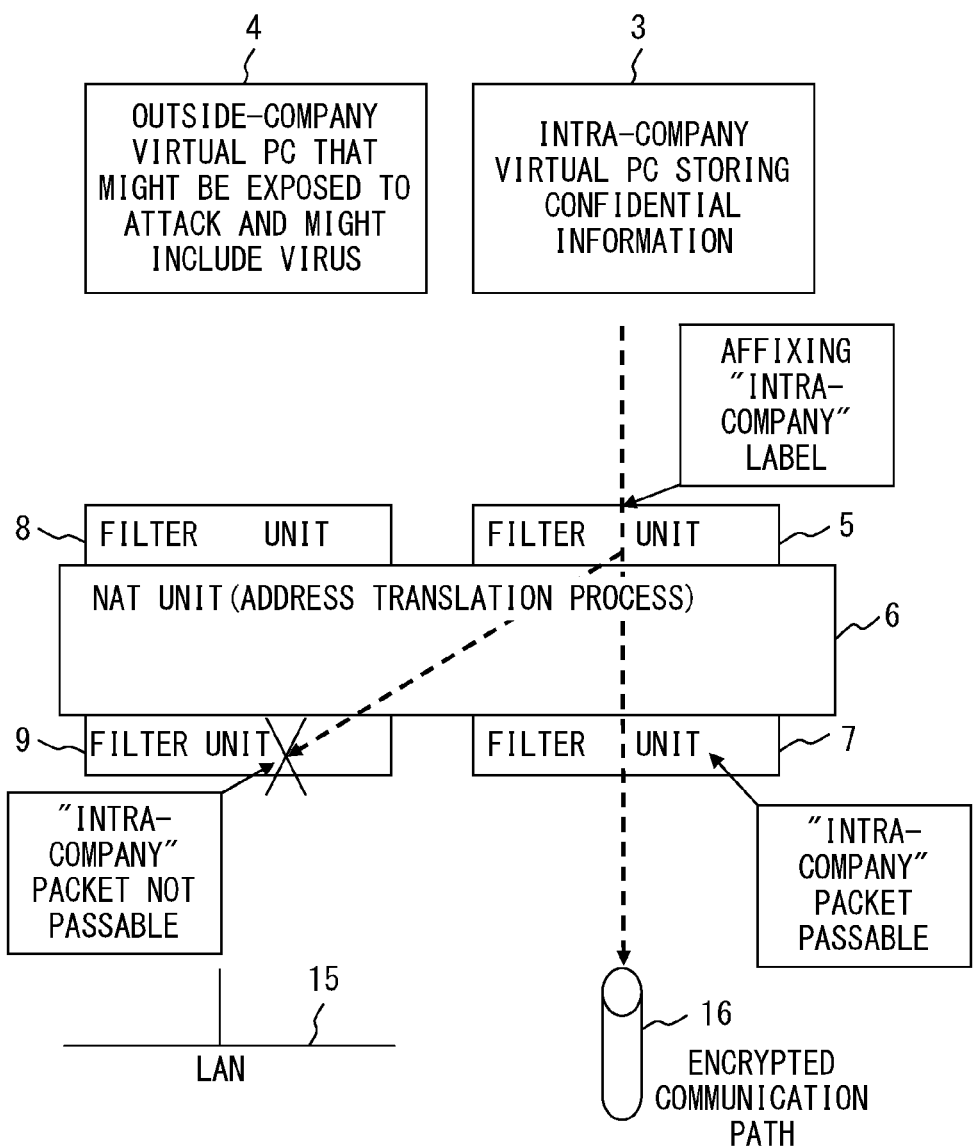
FIG. 12 is a schematic (No. 1) illustrating operations performed by the filter units and the NAT unit when a communication between an intra-company virtual PC and an outside is permitted.

FIGS. 12 and 13 illustrate operations performed by the filter units and the NAT unit 6 when a communication between the intra-company virtual PC 3 and an outside is permitted.

Here, the sentence "the communication between the intra-company virtual PC 3 and the outside is permitted" means the following (E1) or (E2).

(E1) Data corresponding to the permission of the communication between the intra-company virtual PC 3 and the outside is written to any one of the files listed in the list, managed by the virtual PC software 2, of output files for login results.
(E2) The virtual PC software 2 has received a notification of the corresponding data from any one of the pieces of user authentication software.

For example, if login is performed by using the VPN client 21 and is performed at a certain site which is outside the company and which is in the vicinity of the access point within the railroad station, data "account identification number=1, network adapter=VPN" is written to a file (not illustrated).

In this case, in FIG. 12, upon receipt of a packet transmitted from the intra-company virtual PC 3, the filter unit 5 determines whether or not supplementary data is added to the received packet. If the supplementary data is not added to the packet, the filter unit 5 references the list, managed by the virtual PC software 2, of output files for login results for all of the pieces of installed user authentication software. Then, the filter unit 5 executes the following process for the files listed within the list.

Namely, the filter unit 5 references the identification number of the account in data, represented as a tuple (an identification number of an account, a network adapter), of the currently-focused file. The filter unit 5 thereby obtains a certain row represented as a tuple (an identification number of an account, a name of a virtual PC permitted to make a communication) within the account table managed by the virtual PC software 2; specifically the filter unit 5 obtains the row that matches the referenced identification number. Then, the filter unit 5 extracts the name of the virtual PC described in this row. At this time, the filter unit 5 adds a tuple (the extracted name of the virtual PC, the above-described network adapter) to a temporary list used in a process to be executed later.

If the extracted name of the virtual PC matches the name of the virtual PC for which the filter unit 5 is responsible, the filter unit 5 learns that its corresponding virtual PC is permitted to communicate. Then, the filter unit 5 executes the process for identifying a virtual PC that has transmitted the packet, and the process for affixing a label.

In the meantime, if the extracted name of the virtual PC mismatches the name of the virtual PC for which the filter unit 5 is responsible, the filter unit 5 recognizes the next listed file in the list as a file to be processed. Then, the filter unit 5 repeats the above described operations for extracting a virtual PC name.

If no more file to be processed is left in the list as a result of such repetition of operations, the filter unit 5 discards the received packet.

The above described process is specifically executed as follows. Namely, the filter unit 5 references the identification number ("1" in this case) of the account in data in a predetermined file (not illustrated). The filter unit 5 thereby obtains a row that matches this identification number, namely, it obtains the row within the account table (not illustrated) managed by the virtual PC software 2. Then, the filter unit 5 extracts, for example, the name "intra-company virtual PC" as the name of the virtual PC described in this row.

If the extracted name of the virtual PC matches the name of the virtual PC for which the filter unit 5 is responsible, the filter unit 5 references a source address included in the packet. Based on the source address, the filter unit 5 identifies the virtual PC (intra-company virtual PC 3 in this case) that has transmitted the packet.

If the name of the identified virtual PC at the source mismatches the name of the virtual PC for which the filter unit 5 is responsible, the filter unit 5 discards the received packet.

If the name of the identified virtual PC at the source matches the name of the virtual PC for which the filter unit 5 is responsible, the filter unit 5 references the above-created temporary list and thereby recognizes a network adapter corresponding to the virtual PC for which the filter unit 5 is responsible. Then, the filter unit 5 references the routing table or the like and thereby determines whether or not the received packet is transmitted to a network corresponding to the recognized network adapter.

If determining that the received packet is not transmitted to the corresponding network, the filter unit 5 discards the received packet.

If determining that the received packet is transmitted to the corresponding network, the filter unit 5 adds certain labels to the packet as supplementary data, namely, the filter unit 5 adds an "intra-company" label, and a "source" label indicating that an address to be translated is the source address. Then, the filter unit 5 transmits the packet to the NAT unit 6.

The NAT unit 6 references the supplementary data of the packet and translates the source address included in the packet from the address of the intra-company virtual PC 3 into that of the PC 1. Then, the NAT unit 6 transmits the address-translated packet to the filter units 7 and 9.

The filter unit 7 that has received the address-translated packet determines whether or not the supplementary data is added to the received packet. If the supplementary data is added, the filter unit 7 further determines whether or not content of the supplementary data is "intra-company".

If the content of the supplementary data is not "intra-company", the filter unit 7 discards the received packet.

If the content of the supplementary data is "intra-company", the filter unit 7 discards only the supplementary data from the received packet, and transmits the remaining portion of the received packet to the encrypted communication path 16.

In the meantime, the filter unit 9 that has received the address-translated packet discards the received packet because the content of the supplementary data of the received packet is not "outside-company" but "intra-company".

A case where a response is made to the packet transmitted in FIG. 12 is described with reference to FIG. 13.

In FIG. 13, the filter unit 7 that has received the response packet to the packet transmitted in FIG. 12 determines whether or not supplementary data is added to the received packet.

If the supplementary data is not added to the received packet, the filter unit 7 references the list of output files for login results. As described above, the list is managed by the virtual PC software 2, and all output files for all the pieces of installed user authentication software are listed in the list. Then, the filter unit 7 executes the following process for files listed within the list.

Namely, the filter unit 7 references the identification number of the account in data, represented as a tuple (an identification number of an account, a network adapter), of the currently-focused file. The filter unit 7 thereby obtains a certain row represented as a tuple (an identification number of an account, a name of a virtual PC permitted to make a communication) within the account table managed by the virtual PC software 2; specifically, the filter unit 7 obtains the row that matches the referenced identification number. Then, the filter unit 7 extracts the name of the virtual PC described in this row. At this time, the filter unit 7 adds a tuple (the extracted name of the virtual PC, the above-described network adapter) to a temporary list used in a process to be executed later.

If the extracted name of the virtual PC matches the name of the virtual PC for which the filter unit 7 is responsible, the filter unit 7 learns that its corresponding virtual PC is permitted to make a communication. Then, the filter unit 7 executes the process for identifying a virtual PC to receive the packet, and the process for affixing a label.

In the meantime, if the extracted name of the virtual PC mismatches the name of the virtual PC for which the filter unit 7 is responsible, the filter unit 7 recognizes the next listed file in the list as a file to be processed, and repeats the above described operations for extracting a virtual PC name.

If no more file to be processed is left in the list as a result of such repetition of operations, the filter unit 7 discards the received packet.

The above described process is specifically executed as follows. Namely, the filter unit 7 references the identification number ("1" in this case) of the account in data of the predetermined file (not illustrated). The filter unit 7 thereby obtains a row that matches this identification number, namely, it obtains the row within the account table (not illustrated) managed by the virtual PC software 2. Then, the filter unit 7 extracts the name "intra-company virtual PC" as the name of the virtual PC described in this row.

If the extracted name of the virtual PC matches the name of the virtual PC for which the filter unit 7 is responsible, the filter unit 7 references transmission history information (not illustrated) held by the PC 1, and the routing table (not illustrated) managed by the NAT unit 6. The filter unit 7 thereby identifies the destination of the received packet.

If the name of the identified virtual PC at the destination mismatches the name of the virtual PC for which the filter unit 7 is responsible, the filter unit 7 discards the received packet.

If the name of the identified virtual PC at the destination matches the name of the virtual PC for which the filter unit 7 is responsible, the filter unit 7 references the above-created temporary list and thereby recognizes a network adapter corresponding to the virtual PC for which the filter unit 7 is responsible. Then, the filter unit 7 references the routing table or the like and thereby determines whether or not the received packet has passed through the network corresponding to the recognized network adapter.

If determining that the received packet has not passed through the corresponding network, the filter unit 7 discards the received packet.

If determining that the received packet has passed through the corresponding network, the filter unit 7 adds certain pieces of data to the packet as supplementary data, namely, the filter unit 7 adds an "intra-company" label, a "destination" label indicating that an address to be translated is the destination address, and the identified destination. Then, the filter unit 7 transmits the packet to the NAT unit 6.

The NAT unit 6 references the supplementary data within the received packet and translates the destination address of the received packet from the address of the PC 1 into that of the intra-company virtual PC 3. Then, the NAT unit 6 transmits the address-translated packet to the filter units 5 and 8.

The filter unit 5 that has received the address-translated packet determines whether or not supplementary data is added to the received packet. If the supplementary data is added, the filter unit 5 further determines whether or not content of the supplementary data is "intra-company".

If the content of the supplementary data is not "intra-company", the filter unit 5 discards the received packet.

If the content of the supplementary data is "intra-company", the filter unit 5 discards only the supplementary data from the received packet, and transmits the remaining portion of the received packet to the intra-company virtual PC 3.

In the meantime, the filter unit 8 that has received the address-translated packet discards the received packet because the content of the supplementary data of the received packet is not "outside-company" but "intra-company".

Operations of the PC 1 illustrated in FIG. 1 are described next with reference to FIGS. 14 to 17.

FIG. 14 illustrates a state where the user uses the PC 1 illustrated in FIG. 1 within the company.

In this case, before a user authentication, the PC 1 that is connectable to an outside is unable to communicate with the outside of the LAN because it has not been authenticated yet by the 802.1X authentication hub 35 installed within the company. Neither the intra-company virtual PC 3 nor the outside-company virtual PC 4 is permitted to communicate with an outside.

An 802.1X authentication process is manually or automatically executed with the 802.1X client 22. When the authentication succeeds, the PC 1 is permitted by the 802.1X authentication hub 35 to communicate with an outside.

Upon success of the 802.1X authentication, a pair of an identification number of the authenticated account and a network adapter is output from the 802.1X client 22 to a predetermined file. According to the information output to this file, an operation mode of the NAT unit 6 is decided. Here, the NAT unit 6 operates in the operation mode in which not the outside-company virtual PC 4 but the intra-company virtual PC 3 is permitted to communicate with the outside.

According to the operation mode thus decided, as described above, an address of a packet is translated by the NAT function included in the virtual PC software 2 when a communication is made between the intra-company virtual PC 3 and the outside. As a result, this communication is recognized as a communication with the PC 1 itself when it is recognized by an external device such as the authentication hub, a server or the like. Consequently, the intra-company virtual PC 3 that stores confidential information is enabled to communicate with an external server.

In the meantime, the outside-company virtual PC 4 that might have a virus is unable to communicate with the outside. As a result, a virus that might hide within the outside-company virtual PC 4 is disabled to attack the PC 1 itself and the outside of the network.

Figure 15:
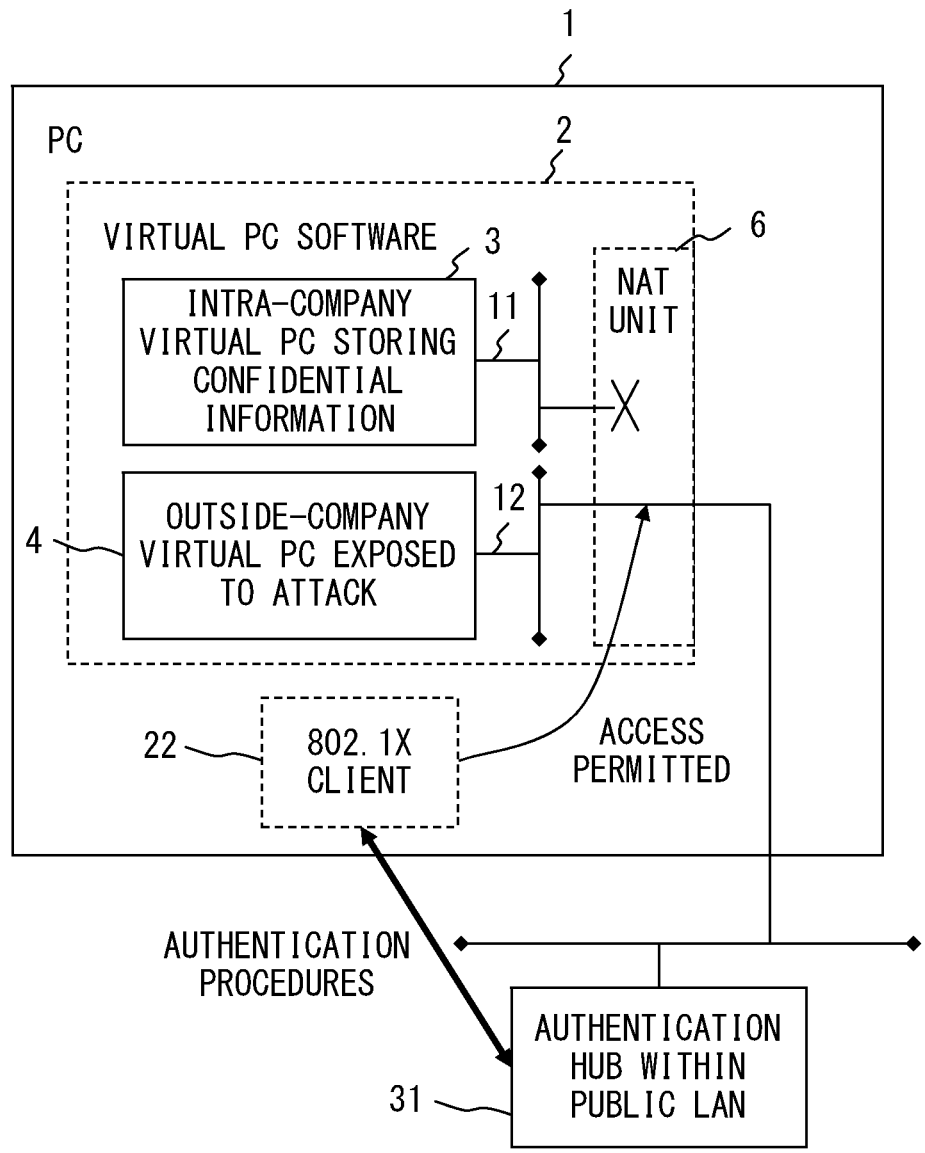
FIG. 15 is a schematic (No. 2) of the first example of operations performed by the PC illustrated in FIG. 1.

FIG. 15 illustrates a state (No. 1) where the user stays outside the company and he or she uses the PC 1 illustrated in FIG. 1.

In this case, before an authentication process, the PC 1 that is connectable to an outside is unable to communicate with an outside because it has not been authenticated yet by the authentication hub 31 within the public LAN. Neither the intra-company virtual PC 3 nor the outside-company virtual PC 4 is permitted to communicate with the outside.

The 802.1X authentication process is manually or automatically executed with the 802.1X client 22. In this case, assume that the authentication hub 31 supports 802.1 authentication and that the authentication succeeds accordingly. Upon success of the authentication, the PC 1 is permitted by the authentication hub 31 to communicate with the outside.

Upon success of the 802.1X authentication, a pair of an identification number of the account and a network adapter is output from the 802.1X client 22 to a predetermined file. According to the information output to this predetermined file, an operation mode of the NAT unit 6 is actually decided. Here, the NAT unit 6 operates in the operation mode in which not the intra-company virtual PC 3 but the outside-company virtual PC 4 is permitted to communicate with the outside.

According to the operation mode thus decided, as described above, an address of a packet is translated by the NAT function included in the virtual PC software 2 when a communication is made between the outside-company virtual PC and the outside. Accordingly, this communication is recognized as a communication with the PC 1 itself when it is recognized by an external device (such as an authentication hub or a server). As a result, the outside-company virtual PC 4 is enabled to communicate with an external server via the public LAN.

The communication thus enabled leads to a risk of an attack from a virus or a risk of infection with a virus. However, a communication is enabled without a constraint imposed on the intra-company LAN. Moreover, the intra-company virtual PC 3 that stores confidential information remains unable to communicate with the outside. Therefore, it is possible to prevent the intra-company virtual PC 3 from leaking the confidential information or from being attacked by a virus or the like.

Figure 16:
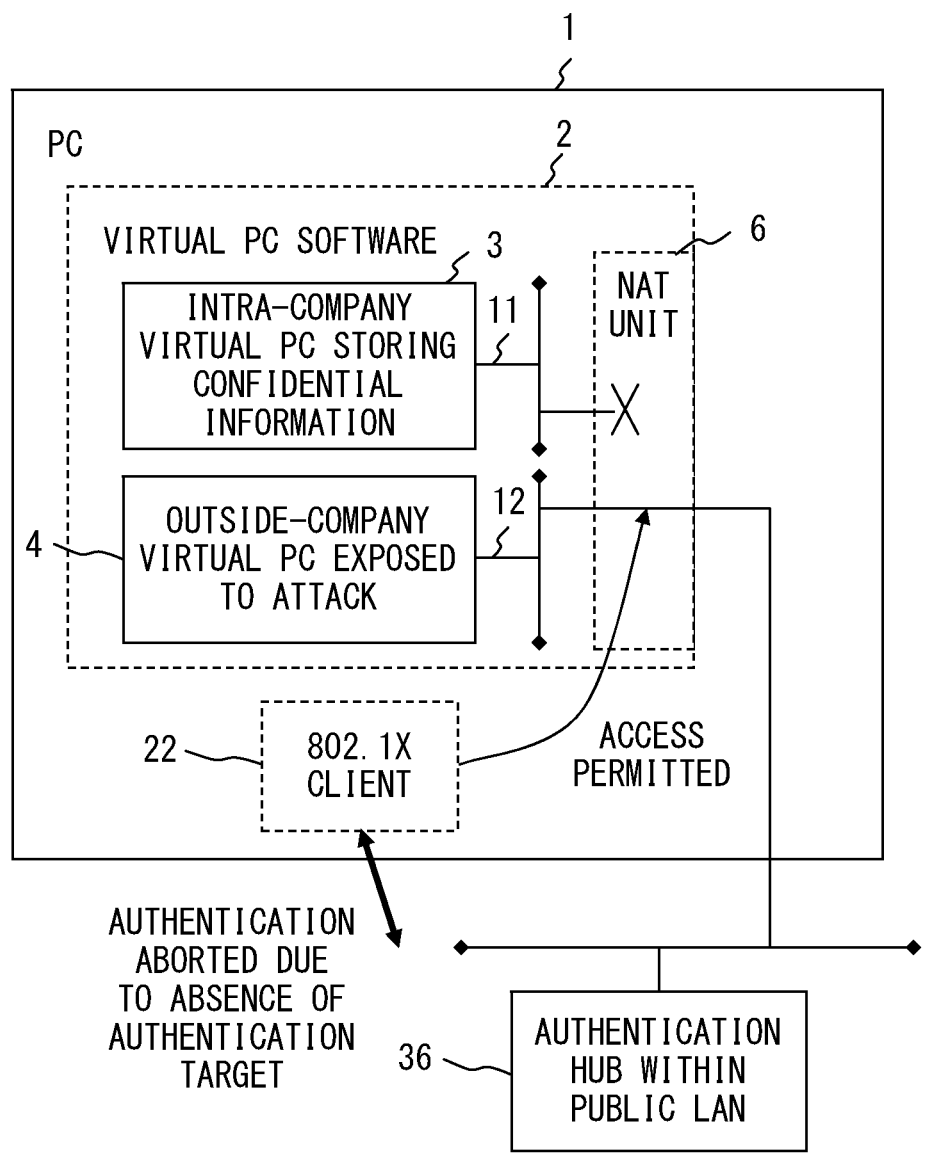
FIG. 16 is a schematic (No. 3) of the first example of operations performed by the PC illustrated in FIG. 1.

FIG. 16 illustrates a state (No. 2) where the user stays outside the company and he or she uses the PC 1 illustrated in FIG. 1.

In this case, in the prior state in which an authentication process has not yet been performed, the PC 1 that is connectable to an outside is unable to communicate with the outside because it has not been authenticated yet by an authentication hub 36 within the public LAN. Neither the intra-company virtual PC 3 nor the outside-company virtual PC 4 is permitted to communicate with the outside.

The 802.1X authentication process is manually or automatically executed with the 802.1X client 22. In this case, assume that the authentication hub 36 does not support the 802.1X authentication and that the authentication fails accordingly. Despite failure of the authentication, the PC 1 is still able to transmit a packet.

Upon failure of the 802.1X authentication, the 802.1X client 22 outputs, to a predetermined file, a pair of information indicating the failure, and a network adapter (or more accurately, an indication of it). In this case, the value indicating the network adapter is fixedly set to "LAN".

According to the information output to this predetermined file, an operation mode of the NAT unit 6 is actually decided. Here, when the authentication fails, the NAT unit 6 is controlled to operate in the operation mode in which not the intra-company virtual PC 3 but the outside-company virtual PC 4 is permitted to communicate with an outside.

According to the operation mode thus decided, as described above, an address of a packet is translated by the NAT function included in the virtual PC software 2 when a communication is made between the outside-company virtual PC and the outside. Accordingly, this communication is recognized as a communication with the PC 1 itself when it is recognized by an external device such as the authentication hub, a server or the like. As a result, the outside-company virtual PC 4 is enabled to communicate with an external server via the public LAN.

The communication thus enabled leads to a risk of an attack from a virus or a risk of infection with a virus. However, a communication is enabled without a constraint imposed on the intra-company LAN. Moreover, the intra-company virtual PC 3 that stores confidential information remains unable to communicate with the outside. Therefore, it is possible to prevent the intra-company virtual PC 3 from leaking the confidential information or from being attacked by a virus or the like.

FIG. 17 illustrates a state (No. 3) where the user stays outside the company and he or she uses the PC 1 illustrated in FIG. 1.

The state after the authentication process of FIG. 15 or 16 has been executed, or the prior state presupposed for FIG. 16 is the prior state presupposed for FIG. 17.

Assuming the state in which the authentication process of FIG. 15 or 16 has been executed, the outside-company virtual PC 4 is permitted to communicate with the outside via the Internet, whereas the intra-company virtual PC 3 is not permitted to communicate with an outside via the Internet. Alternatively, assuming the prior state presupposed for FIG. 16, neither the outside-company virtual PC 4 nor the intra-company virtual PC 3 is permitted to communicate with an outside via the Internet. In either case, the intra-company virtual PC 3 is not permitted to communicate with an outside via the Internet.

Upon connection to the VPN access point 17 from the VPN client 21, a VPN authentication process is executed. When the VPN authentication has succeeded, the encrypted communication path 16 encrypted between the VPN client 21 and the VPN access point 17 is established.

When the VPN authentication has succeeded, a pair of an identification number of an account and a network adapter is output from the VPN client 21 to a predetermined file. According to the information output to this predetermined file, an operation mode of the NAT unit 6 is actually decided. Here, the NAT unit 6 operates in the operation mode in which at least the intra-company virtual PC 3 is permitted to make a communication via the encrypted communication path 16.

The outside-company virtual PC 4 remains permitted to make a communication via the Internet, or remains unpermitted to communicate with the outside. In either case, the operation mode with respect to the network address translation for the outside-company virtual PC 4 is not changed upon the VPN authentication.

According to the operation mode thus decided, as described above, when a communication is made between the intra-company virtual PC 3 and the outside, an address of each packet is translated by the NAT function included in the virtual PC software 2, and each packet is encrypted by the VPN client 21 and transmitted to the VPN access point 17. Accordingly, when the packet is decrypted at the VPN access point 17, this communication is recognized as a communication with the PC 1 itself. As a result, the intra-company virtual PC 3 is enabled to communicate with the intra-company server via the VPN access point 17.

The intra-company virtual PC 3 that stores confidential information is enabled to only access the inside of the company via the encrypted path 16 as described above. Accordingly, when the confidential information flows in the Internet, the confidential information always flows in an encrypted form. Consequently, the confidential information hardly leaks or is falsified.

In contrast, the outside-company virtual PC 4 is permitted to communicate with the outside via the Internet, for example, in the state in which the authentication process of FIG. 15 or 16 has been executed. However, a virus that might hide in the outside-company virtual PC 4 does not flow into the encrypted communication path 16. Therefore, the encrypted communication path 16, the intra-company virtual PC 3, and the intra-company system(s) are not affected by an attack of the virus and are protected.

A second usage pattern of the PC 1 illustrated in FIG. 1 is described next with reference to FIGS. 18 and 19.

FIGS. 18 and 19 assume a case where the user inputs his or her account and password on a startup screen (i.e., console) upon boot-up of the PC 1.

In this case, assume that the user logs in to the PC 1 with an intra-company account (such as "user1-intra") when staying within the company and connecting the PC 1 to a network. Also assume that the user logs in to the PC 1 with an outside-company account (such as "user1-outer") when staying outside the company and connecting the PC 1 to a network.

FIG. 18 illustrates a state where the user stays within the company and uses the PC 1 illustrated in FIG. 1 in the second usage pattern.

In this case, in the presupposed prior state, the PC 1 that is connectable to an outside is connected to an intra-company LAN but has not been booted up yet. Moreover, neither the intra-company virtual PC 3 nor the outside-company virtual PC 4 is permitted to communicate with the outside.

The user logs in to the PC 1 with an account for accessing the intra-company LAN on a startup screen upon boot-up of the PC 1. Here, assume that the user logs in to the PC 1 with the ID "user1-intra".

The PC 1 or the host OS equipped with a process for displaying the startup screen as part of its functions manages an association table (not illustrated) that makes an association between a logged-in account and an identification number for identifying the account. The PC 1 or the host OS outputs, to a predetermined file, an identification number and a network adapter (or more accurately, an indication of it) at the time of the login process based on the association table. In this case, the value indicating the network adapter is fixedly set to "LAN".

According to the information output to this predetermined file, an operation mode of the NAT unit 6 is actually decided. Here, the NAT unit 6 operates in the operation mode in which not the outside-company virtual PC 4 but the intra-company virtual PC 3 is permitted to communicate with an outside.

According to the operation mode thus decided, as described above, an address of a packet is translated by the NAT function included in the virtual PC software 2 when a communication is made between the intra-company virtual PC 3 and the outside. Accordingly, this communication is recognized as a communication with the PC 1 itself when it is recognized by an external device such as an authentication hub, a server or the like. As a result, the intra-company virtual PC 3 is enabled to communicate with an external server.

The outside-company virtual PC 4 that might include a virus remains unable to communicate with the outside, and thus a virus that might hide within the outside-company virtual PC 4 is disabled to attack the PC 1 itself and the outside of the network.

FIG. 19 illustrates a state where the user stays outside the company and uses the PC 1 illustrated in FIG. 1 in the second usage pattern.

In this case, in the presupposed prior state, the PC 1 that is connectable to an outside is connected to a public LAN but has not been booted up yet. Moreover, neither the intra-company virtual PC 3 nor the outside-company virtual PC 4 is permitted to communicate with the outside.

The user logs in to the PC 1 with an account for accessing the public LAN on a startup screen upon boot-up of the PC 1. Here, assume that the user logs in to the PC 1 with the ID "user1-outer".

The PC 1 or the host OS equipped with a process for displaying the startup screen as part of its functions manages an association table (not illustrated) that makes an association between a logged in account and an identification number for identifying the account. The PC 1 or the host OS outputs, to a predetermined file, an identification number and a network adapter (or more accurately, an indication of it) at the time of the login process based on the association table. In this case, the value indicating the network adapter is fixedly set to "LAN".

According to the information output to this predetermined file, an operation mode of the NAT unit 6 is actually decided. Here, the NAT unit 6 operates in the operation mode in which not the intra-company virtual PC 3 but the outside-company virtual PC 4 is permitted to communicate with an outside. In FIG. 19, the user authentication process is not executed between the PC 1 and an authentication hub 38 near the PC 1. However, the PC 1 is still able to transmit a packet regardless of whether or not the user authentication process is executed.

According to the operation mode thus decided, as described above, an address of a packet is translated by the NAT function included in the virtual PC software 2 when a communication is made between the outside-company virtual PC and the outside. Accordingly, this communication is recognized as a communication with the PC 1 itself when it is recognized by an external device such as the authentication hub, a server or the like. As a result, the outside-company virtual PC 4 is enabled to communicate with an external server.

The intra-company virtual PC 3 that stores confidential information remains unable to communicate with the outside. Therefore, it is possible to prevent the intra-company virtual PC 3 from leaking the confidential information, or from being attacked by a virus or the like.

A third usage pattern of the PC 1 illustrated in FIG. 1 is described next with reference to FIGS. 20 and 21.

Figure 20:
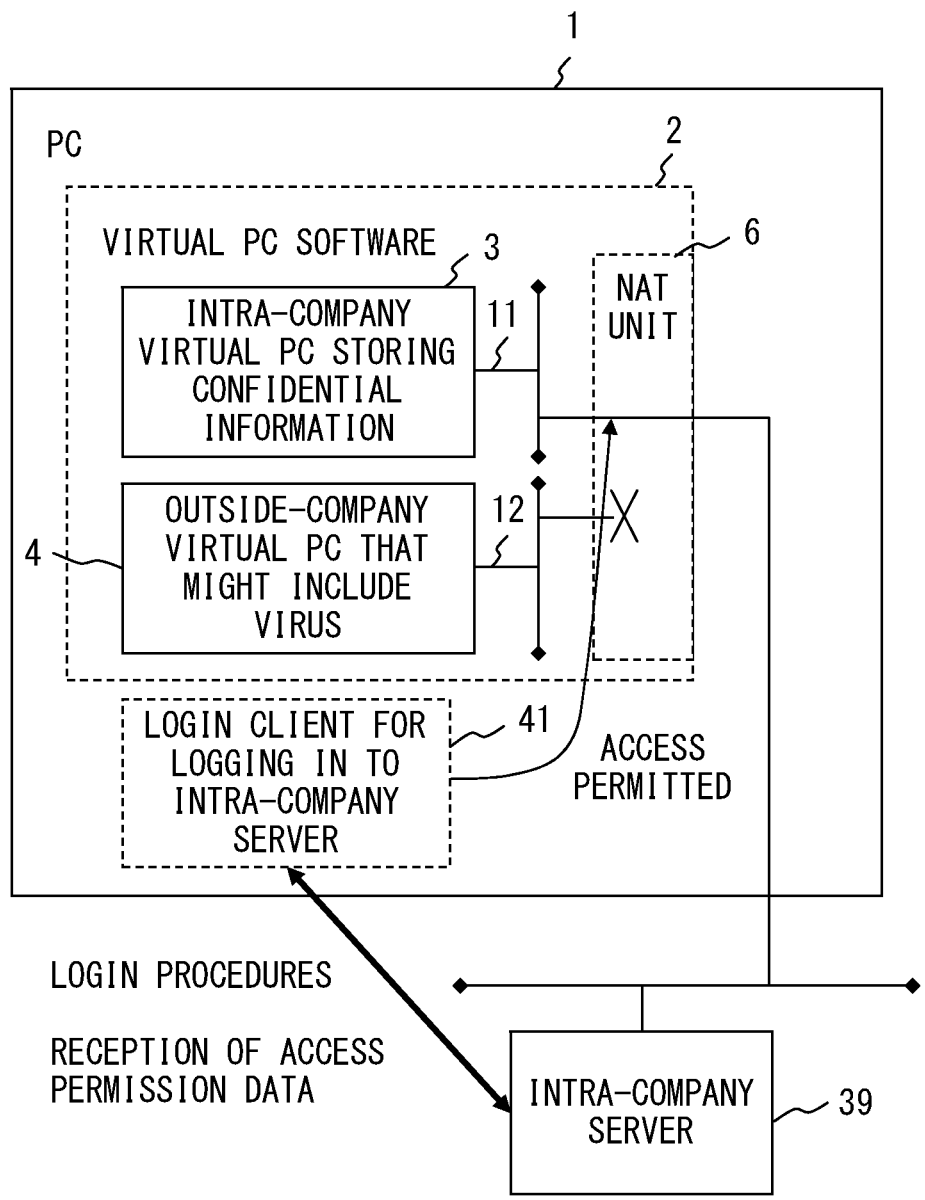
FIG. 20 is a schematic (No. 1) of a third example of operations performed by the PC illustrated in FIG. 1.

FIGS. 20 and 21 assume a case where the user logs in to an intra-company server 39 by using a login client 41 for logging in to the intra-company server.

FIG. 20 illustrates a state where the user stays within the company and uses the PC 1 illustrated in FIG. 1 in the third usage pattern.

In this case, the PC 1 that is connectable to an outside is connected to the intra-company LAN in the presupposed prior state. Moreover, neither the intra-company virtual PC 3 nor the outside-company virtual PC 4 is permitted to communicate with an outside.

A process of login to the intra-company server 39 is manually or automatically executed with the login client 41 for logging in to the intra-company server.

When the login has succeeded, the login client 41 for logging in to the intra-company server outputs, to a predetermined file, an identification number of a logged-in account and a network adapter (or more accurately, an indication of it). According to the information output to this predetermined file, an operation mode of the NAT unit 6 is actually decided. Here, the NAT unit 6 operates in the operation mode in which not the outside-company virtual PC 4 but the intra-company virtual PC 3 is permitted to communicate with an outside.

According to the operation mode thus decided, as described above, an address of a packet is translated by the NAT function included in the virtual PC software 2 when a communication is made between the intra-company virtual PC 3 and the outside. Accordingly, this communication is recognized as a communication with the PC 1 itself when it is recognized by an external device such as an authentication hub, a server or the like. As a result, the intra-company virtual PC 3 is enabled to communicate with an external server.

The outside-company virtual PC 4 that might include a virus remains unable to communicate with the outside. Therefore, a virus that might hide within the outside-company virtual PC 4 is disabled to attack the PC 1 itself or the outside of the network.

FIG. 21 illustrates a state where the user stays outside the company and uses the PC 1 illustrated in FIG. 1 in the third usage pattern.

In this case, the PC 1 that is connectable to an outside is connected to the public LAN in the presupposed prior state. Moreover, neither the intra-company virtual PC 3 nor the outside-company virtual PC 4 is permitted to communicate with an outside.

The user attempts to manually or automatically log in to the intra-company server 39 with the login client 41 for logging in to the intra-company server. However, the PC 1 is not connected to the intra-company server, and thus there is no target to which the login client 41 logs in. Therefore, the login process fails, or the user aborts the login process. However, even if the login process fails, the PC 1 is still able to transmit a packet.

When the login process fails, the login client 41 for logging in to the intra-company server outputs, to a predetermined file, information indicating that the login has failed, and a network adapter (or more accurately, an indication of it). Note that the value indicating the network adapter is fixedly set to "LAN".

According to the information output to this predetermined file, an operation mode of the NAT unit 6 is actually decided. Here, when the login process has failed, the NAT unit 6 is controlled to operate in the operation mode in which not the intra-company virtual PC 3 but the outside-company virtual PC 4 is permitted to communicate with an outside.

According to the operation mode thus decided, as described above, an address of a packet is translated by the NAT function included in the virtual PC software 2 when a communication is made between the outside-company virtual PC and the outside. Accordingly, this communication is recognized as a communication with the PC 1 itself when it is recognized by an authentication hub or a server. As a result, the outside-company virtual PC 4 is enabled to communicate with an external server.

The intra-company virtual PC 3 that stores confidential information remains unable to communicate with the outside. Therefore, it is possible to prevent the intra-company virtual PC 3 from leaking the confidential information, and from being attacked by a virus or the like.

If a virtual PC is newly permitted to communicate with an outside, it is preferable to stop a network access by another virtual PC that is communicable with the outside by using the same network adapter as the newly permitted virtual PC uses.

Performing such an access control prevents intersection (or overlapping) of a path on which data is input to or output from one virtual PC, and a path on which data is input to or output from another virtual PC. Accordingly, for example, even if a virus intrudes into one virtual PC, it is possible to prevent the virus infection from spreading beyond the intruded virtual PC. As a result, it becomes possible to improve the security level of the PC itself by preventing other virtual PCs, the PC itself, and the virtual machine execution program from being infected with the virus.

FIG. 22 illustrates examples of storage media for storing a program for executing the processes in the above-mentioned embodiment.

The program and data for executing the processes in the above-mentioned embodiment may be loaded into a memory of a computer 50 from a storage device 51 of the computer 50, and the program may be executed with the data. Alternatively, the program and the data may be loaded into the memory of the computer 50 from a portable storage medium 53, and the program may be executed with the data. Still alternatively, the program and the data may be loaded into the memory of the computer 50 from an external storage device 54 via a network 55, and the program may be executed with the data.

The memory of the computer 50, the storage device 51, and the external storage device 54 are examples of non-transitory computer-readable storage devices. The portable storage medium 53 is an example of a non-transitory computer-readable storage medium.

Finally described is a summary of some advantageous features of the above-mentioned embodiments.

According to any of the embodiments, a virtual machine permitted to make a communication is decided by referencing a storing unit that makes an association between an identification of an account and a virtual machine to be permitted to make a communication. Note that the reference is performed based on an identification of a logged-in account.

If a virtual machine at a source of data is a virtual machine permitted to make a communication, the data is allowed to pass through. Alternatively, if the virtual machine at the source of the data is not the virtual machine permitted to make a communication, the data is discarded.

If a virtual machine at a destination of data that has passed through a network is a virtual machine permitted to make a communication, the data is allowed to pass through. Alternatively, if the virtual machine at the destination of the data is not the virtual machine permitted to make a communication, the data is discarded.

Namely, it is possible to control both of an incoming access to a device concerned from its outside and an outgoing access from the device to the outside. An example of the device noted herein is the PC 1.

Herein, assume the following assumptions (F1) through (F4).

(F1) A user inputs his or her first account (e.g., intra-company account) for use within a particular organization (e.g., company) if he or she is within the organization.

(F2) The user inputs his or her second account (e.g., outside-company account) for use outside the organization if he or she is outside the organization.

(F3) In the storing unit, an identification of the first account is associated with a first virtual machine to be booted up for in-house use. An example of the first virtual machine is an intra-company virtual PC 3.

(F4) In the storing unit, an identification of the second account is associated with a second virtual machine to be booted up for outside use. An example of the second virtual machine is an outside-company virtual PC 4.

Consequently, the following results (G1) and (G2) are derived.

(G1) The first virtual machine is permitted to make a communication if the user logs in with the first account.

(G2) The second virtual machine is permitted to make a communication if the user logs in with the second account.

Accordingly, undesirable scenarios such as the following scenarios (H1) and (H2) are avoided, thereby resulting in improvement in the security level of the above-noted device itself (e.g., portable information processing device itself).

(H1) The user logs in with the outside-company account whereas he or she is within the company. As a result, the outside-company virtual machine is permitted to communicate with an outside. Consequently, an intra-company system might be attacked by a virus that might hide in the outside-company virtual machine.

(H2) The user logs in with the intra-company account whereas he or she is outside the company. As a result, the intra-company virtual machine is permitted to communicate with an outside. Consequently, the intra-company virtual machine that stores confidential information might be attacked by a virus.

In addition, performing the previously-described access control when newly permitting a virtual machine a communication with an outside prevents intersection (or overlapping) of a path on which data input to or output from one virtual machine flows, and a path on which data input to or output from another virtual machine flows. Accordingly, for example, even if a virus intrudes into one virtual machine, it is possible to prevent the virus infection from spreading beyond the intruded virtual machine, namely, it is possible to prevent the virus from infecting other virtual machines, the information processing device itself, or a virtual machine execution program.

In summary, the above-discussed embodiments achieve the control on both of an access to the device concerned from its outside and an access from the device to the outside. As a result, it becomes possible to improve the security level of the device itself (e.g., portable information processing device itself).

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment (s) of the present invention has (have) been described in detail, it should be understood that the various changes, substitutions, and alterations could be made hereto without departing from the spirit and scope of the invention.

What is claimed is:

1. A non-transitory computer-readable storage medium on which is recorded a program for causing an information processing device running a plurality of virtual machines to execute a process, the process comprising:

obtaining account information of a user account used by an operation from outside the information processing device;

obtaining identification information for identifying a virtual machine which is one of the plurality of virtual machines and is associated with the user account by the identification information, from a storing unit in which each of a plurality of user accounts is stored in association with identification information for identifying a corresponding one of the plurality of virtual machines; and determining whether to permit data access to a certain network outside the information processing device from a certain virtual machine which is one of the plurality of virtual machines and from which the data access is attempted, based on whether the certain virtual machine is the virtual machine associated with the user account for which the account information is obtained and whether the certain network is a network associated with the virtual machine associated with the user account for which the account information is obtained, provided no other of the plurality of virtual machines has begun communicating outside the information processing device using a network adapter that the certain virtual machine would use.

2. The non-transitory computer-readable storage medium according to claim 1, the process further comprising translating a source address used for the data access from an address of the certain virtual machine into an address of a physical machine, which is the information processing device, when the data access from the certain virtual machine to the certain network outside the information processing device is determined to be permitted.

3. The non-transitory computer-readable storage medium according to claim 1, the process further comprising
   recognizing a network adapter corresponding to the user account for which the account information is obtained, according to a result of a user authentication process; and
   determining whether the certain network, to which the data access is directed, is a network corresponding to the recognized network adapter according to the recognized network adapter and routing information, wherein
   the data access from the certain virtual machine is determined to be permitted when the certain virtual machine is the virtual machine associated with the user account for which the account information is obtained and the certain network is the network corresponding to the recognized network adapter, and
   the data access from the certain virtual machine is determined not to be permitted when the certain virtual machine is not the virtual machine associated with the user account for which the account information is obtained or the certain network is not the network corresponding to the recognized network adapter.

4. The non-transitory computer-readable storage medium according to claim 3, the process further comprising translating a source address used for the data access from an address of the certain virtual machine into an address of a physical machine, which is the information processing device, when the data access from the certain virtual machine to the certain network outside the information processing device is determined to be permitted.

5. A non-transitory computer-readable storage medium on which is recorded a program for causing an information processing device running a plurality of virtual machines to execute a process, the process comprising:
   obtaining account information of a user account used by an operation from outside the information processing device;
   obtaining identification information for identifying a virtual machine which is one of the plurality of virtual machines and is associated with the user account by the identification information, from a storing unit in which each of a plurality of user accounts is stored in association with identification information for identifying a corresponding one of the plurality of virtual machines; and
   determining whether to permit data access from a certain network outside the information processing device to a certain virtual machine which is one of the plurality of virtual machines and to which the data access is attempted, based on whether the certain virtual machine is the virtual machine associated with the user account for which the account information is obtained and whether the certain network is a network associated with the virtual machine associated with the user account for which the account information is obtained, provided no other of the plurality of virtual machines has begun communicating outside the information processing device using a network adapter that the certain virtual machine would use.

6. The non-transitory computer-readable storage medium according to claim 5, the process further comprising translating a destination address used for the data access from an address of a physical machine, which is the information processing device, into an address of the certain virtual machine, when the data access to the certain virtual machine from the certain network outside the information processing device is determined to be permitted.

7. The non-transitory computer-readable storage medium according to claim 5, the process further comprising
   recognizing a network adapter corresponding to the user account for which the account information is obtained, according to a result of a user authentication process; and
   determining whether the certain network, through which the data access has come, is a network corresponding to the recognized network adapter according to the recognized network adapter and routing information, wherein
   the data access to the certain virtual machine is determined to be permitted when the certain virtual machine is the virtual machine associated with the user account for which the account information is obtained and the certain network is the network corresponding to the recognized network adapter, and
   the data access to the certain virtual machine is determined not to be permitted when the certain virtual machine is not the virtual machine associated with the user account for which the account information is obtained or the certain network is not the network corresponding to the recognized network adapter.

8. The non-transitory computer-readable storage medium according to claim 7, the process further comprising translating a destination address used for the data access from an address of a physical machine, which is the information processing device, into an address of the certain virtual machine, when the data access to the certain virtual machine from the certain network outside the information processing device is determined to be permitted.

9. The non-transitory computer-readable storage medium according to claim 3,
   wherein the account information of the user account is obtained by
      receiving the account information about the user account from a user authentication program as the result of the user authentication process performed by the user authentication program or
      reading the account information about the user account from a particular file in which the result has been output by the user authentication program; and
   wherein the network adapter is recognized by
      receiving indication of the network adapter from the user authentication program as the result of the user authentication process or
      reading the indication of the network adapter from the particular file.

10. An information processing device, comprising:
   a user authentication processing unit configured to perform user authentication and to output account information about a user account of a user who is authenticated by the user authentication;
   a first storing unit configured to store first association information that associates each of a plurality of user accounts with identification information for identifying a corresponding one of a plurality of virtual machines executable on the information processing device, which is a physical machine;

a first determining unit configured to determine whether to permit outgoing data access from a first virtual machine which is one of the plurality of virtual machines and from which the outgoing access is attempted, to a first network outside the information processing device, based on whether the first virtual machine is associated with the user account of the authenticated user and whether the first network is associated with the first virtual machine, provided no other of the plurality of virtual machines has begun communicating outside the information processing device using a network adapter that the first virtual machine would use; and a second determining unit configured to determine whether to permit incoming data access from a second network outside the information processing device to a second virtual machine which is one of the plurality of virtual machines and to which the incoming data access is attempted, based on whether the second virtual machine is associated with the user account of the authenticated user and whether the second network is associated with the second virtual machine.

11. The information processing device according to claim 10, further comprising an address translating unit configured
to translate a source address used for the outgoing data access from an address of the first virtual machine into an address of the physical machine when the outgoing data access is determined to be permitted and
to translate a destination address used for the incoming data access from the address of the physical machine into an address of the second virtual machine when the incoming data access is determined to be permitted.

12. The information processing device according to claim 10, wherein the user authentication processing unit further outputs network adapter information for identifying a network adapter corresponding to the user account of the authenticated user, the information processing device further comprising:
a third determining unit configured to determine whether the first network, to which the outgoing data access is directed, is a network corresponding to the network adapter by using the network adapter information and routing information;
a first filter processing unit configured
to permit the outgoing data access from the first virtual machine when the first virtual machine is associated with the user account of the authenticated user and the first network is the network corresponding to the network adapter, and
not to permit the outgoing data access from the first virtual machine when the first virtual machine is not associated with the user account of the authenticated user or the first network is not the network corresponding to the network adapter;
a fourth determining unit configured to determine whether the second network, through which the incoming data access has come, is the network corresponding to the network adapter; and
a second filter processing unit configured
to permit the incoming data access to the second virtual machine when the second virtual machine is associated with the user account of the authenticated user and the second network is the network corresponding to the network adapter, and
not to permit the incoming data access to the second virtual machine when the second virtual machine is not associated with the user account of the authenticated user or the second network is not the network corresponding to the network adapter.

13. The information processing device according to claim 12, further comprising an address translating unit configured
to translate a source address used for the outgoing data access from an address of the first virtual machine into an address of the physical machine when the first filter processing unit permits the outgoing data access and
to translate a destination address used for the incoming data access from the address of the physical machine into an address of the second virtual machine when the second filter processing unit permits the incoming data access.

14. The information processing device according to claim 10, further comprising:
a selection operating unit configured to enable the user to select whether the information processing device is within an organization upon boot-up of the information processing device; and
a second storing unit configured to store second association information that makes an association among
each of the plurality of user accounts,
a password,
an identification for identifying a pair of the user account and the password, and
a use site indicating whether the user account is for use within the organization,
wherein the user authentication processing unit sequentially attempts to authenticate one or more user accounts that are associated by the second association information with a use site matching a selection result of the selection operating unit.

15. The information processing device according to claim 10 being a portable personal computer.

* * * * *